(12) United States Patent
Marshall

(10) Patent No.: US 6,332,432 B1
(45) Date of Patent: Dec. 25, 2001

(54) ANIMAL-BORNE IMAGING AND DATA LOGGING SYSTEM

(75) Inventor: Gregory John Marshall, Falls Church, VA (US)

(73) Assignee: National Geographic Society, Washington, DC (US)

( * ) Notice: Subject to any disclaimer, the term of this patent is extended or adjusted under 35 U.S.C. 154(b) by 0 days.

(21) Appl. No.: 09/430,247

(22) Filed: Oct. 29, 1999

(51) Int. Cl.[7] .............................. A62B 37/00; G09F 3/00
(52) U.S. Cl. .............................................. 119/859; 40/300
(58) Field of Search ................................... 119/839, 858, 119/860; 40/300, 301, 303, 304; 43/42.09, 42.35

(56) References Cited

U.S. PATENT DOCUMENTS

| | | | |
|---|---|---|---|
| 1,623,002 | * | 3/1927 | Gossett . |
| 2,963,543 | | 12/1960 | Link et al. . |
| 2,996,826 | * | 8/1961 | Lamar . |
| 2,996,966 | | 8/1961 | Edgerton . |
| 3,595,218 | * | 7/1971 | Kirkpatrick et al. ................. 600/387 |
| 3,608,228 | * | 9/1971 | Borresen et al. . |
| 3,702,014 | * | 11/1972 | Rabon et al. ............................. 441/6 |
| 3,957,296 | | 5/1976 | Langguth . |
| 3,990,401 | * | 11/1976 | Langguth ............................... 116/26 |
| 4,030,225 | * | 6/1977 | Earley .................... 43/42.09 |
| 4,232,417 | * | 11/1980 | Miller et al. ........................... 441/30 |
| 4,244,500 | | 1/1981 | Fournier . |
| 4,250,651 | * | 2/1981 | Ramme ................................. 43/17.6 |
| 4,432,156 | * | 2/1984 | Gowing ............................... 43/42.31 |
| 4,765,276 | | 8/1988 | Kime . |
| 4,790,090 | * | 12/1988 | Sharber .................................. 40/300 |
| 4,875,145 | * | 10/1989 | Roberts ................................ 362/103 |
| 4,881,340 | * | 11/1989 | Davis .................................. 43/42.06 |
| 4,888,905 | * | 12/1989 | Garr .................................... 43/17.6 |
| 5,046,456 | * | 9/1991 | Heyman et al. ...................... 119/859 |
| 5,305,030 | | 4/1994 | Yokoyama et al. . |
| 5,353,054 | | 10/1994 | Geiger . |
| 5,441,017 | * | 8/1995 | Lindsay ................................. 119/795 |
| 5,537,774 | * | 7/1996 | Muhammad ........................... 43/42.2 |
| 5,579,865 | | 12/1996 | Butler et al. . |
| 5,983,553 | * | 11/1999 | Gordon ................................. 43/17.6 |
| 6,006,467 | * | 12/1999 | Ulrich ................................. 43/43.16 |
| 6,079,145 | * | 6/2000 | Barringer ............................. 43/42.06 |
| 6,095,094 | * | 8/2000 | Phillips ................................ 119/792 |

OTHER PUBLICATIONS

S. Eckert et al., 1989 "Proceedings of the Ninth Annual Workshop on Sea Turtle Conservation and Biology" NOAA Technical Memorandum NMFS–SEFC–232 Aug. 1989.

Asheville Citizen Times, 1989 "Greg Marshall fits a prototype underwater camcorder onto an alligator recently . . . ".

G. Marshall "A video–collar to study aquatic fauna: A view from the animal's back" 1989.

G. Marshall "I am a Camera" Washington CityPaper, Jul. 17, 1992.

H. Whitehead "Potential Scientific Benefits of Using Crittercam on Sperm Whales" National Geographic Society Nov. 10, 1993.

D. Ettlin "Rescued whale is well again and soon will swim free" Baltimore Sun Apr. 23, 1994.

(List continued on next page.)

*Primary Examiner*—Charles T. Jordan
*Assistant Examiner*—Yvonne R. Abbott
(74) *Attorney, Agent, or Firm*—Morrison & Foerster LLP

(57) ABSTRACT

An animal-borne instrumentation system having an integrated tail assembly that reduces hydrodynamic drag while inducing positive buoyancy and providing increased useable space for instrumentation storage. The system comprises a submersible, pressure-resistant housing and means for harnessing the housing to an animal under study. The housing is designed to contain any combination of image and datalogging and/or transmission equipment useful for obtaining information about the animal or its habitat, as well as other gear necessary to support such equipment.

38 Claims, 21 Drawing Sheets

OTHER PUBLICATIONS

Abstracts of Eleventh Biennial Conference on the Biology of Marine Mammals, Dec. 14, 1995.

S. Iosefa "Whales to carry cameras" The Kaikowa Star Mar. 1, 1997.

* cited by examiner

CONT'D ON FIG.10A

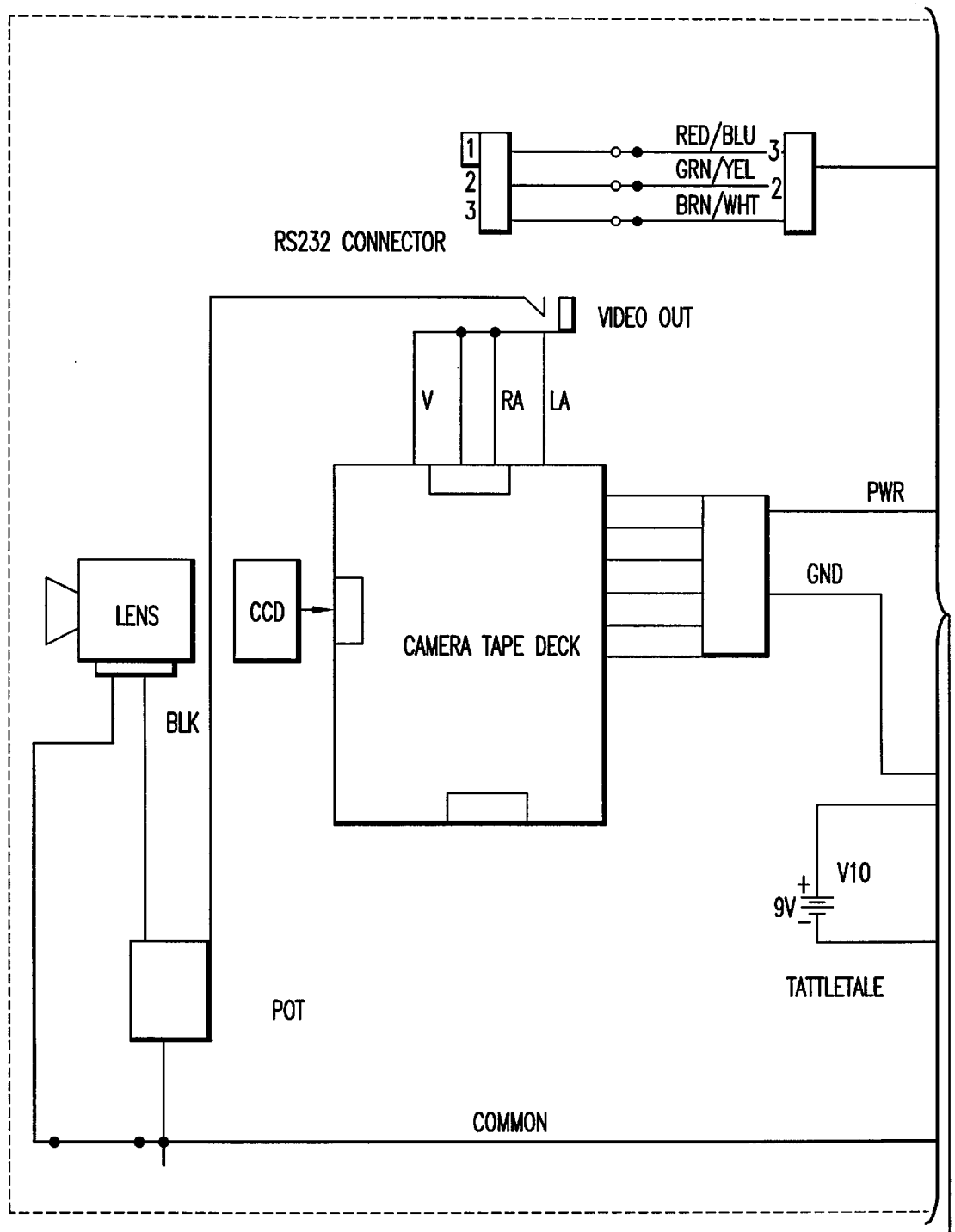
FIG. 12    CONT'D ON FIG.12A

FIG. 16

ANIMAL-BORNE IMAGING AND DATA LOGGING SYSTEM

FIELD OF THE INVENTION

The present invention pertains to instrumentation systems attached to animals. More particularly, the invention provides a system with improved hydrodynamics suitable for releasably securing to a marine or aquatic host instrumentation for capturing imagery and data.

BACKGROUND OF THE INVENTION

Many marine and terrestrial animal species have proven difficult to study in their native habitats because of their complex behavioral patterns and the inhospitable environment in which they live. Many species exhibit an unnatural reaction to the presence of their human observers, while still others enjoy such a vast and varied habitat that first-hand observation by humans is highly impractical if not impossible, making the task of studying them that much more difficult. These and related factors have severely hindered mankind's ability to understand basic biology and the conservation needs of certain animal species. To address this shortfall, instrumentation has been deployed on wild animals to assess habitat, behavior and physiology. Many instrumentation systems acquire data on their host's location, locomotion, foraging behavior and physiological parameters such as stomach temperature and heart-rate. In the case of aquatic or marine species, diving behavior is also monitored with particular interest. However, the absence of contemporaneous visual observations has left scientists to infer much about the animal's life from rudimentary data.

Various animal-borne imaging systems have been deployed on wild animals to capture images revealing the animal's interaction with its environment. The animal to which the housing is secured serves as a host, carrying the system wherever it travels throughout the course of its daily activities. The visual information provided by such systems has generated unprecedented insight into how wild animals interact with their environment and has advanced research to levels unattainable through systematic human observation.

Systems for securing image and data capturing instrumentation to animals have existed in one form or another for a number of years. The goal has always been to develop a system able to withstand the harsh salt water environment that is home to numerous species of ocean-going animals, such as whales, sharks, dolphins, porpoises, tortoises, rays, walruses, seals and sea lions. That objective, however, had proven elusive to attain within a single system. Salt water is the primary bane of delicate instrumentation because of its corrosive effect and electrical conductivity. Another major consideration is the tremendous pressure imposed on the system by the depth of the water column. Any system incapable of withstanding the ocean depths will succumb under the pressure exerted by the water column, permitting salt water to threaten the instrumentation and data stored inside. Additionally, the lack of light penetration into the deeper reaches of the ocean presents another complicating factor in image capturing.

Prior animal-borne imaging and data systems provided a pressure-resistant housing having a cylindrical shape with a flat, circular rearward surface. Although simple in construction, those systems suffered from excessive hydrodynamic drag induced by a cavitation point created directly behind the flat rearward surface of the housing as the host towed the system through the water.

Prior systems having a flat rearward surface also suffered from a lack of positive buoyancy. Once a system loses positive buoyancy it will sink, possibly irretrievably, carrying with it any recorded data. Thus, a flotation aid made of syntactic foam had to be added to the cylindrical housing to force the system to the surface of the water after detachment from its host where it could be retrieved by triangulating its on-board radio beacon. The flotation aid was generally conical in shape with its circular base end being affixed to the flat, circular rearward surface of the cylindrical housing with screws such that the point of the cone-shaped flotation aid pointed generally away from the host's normal direction of forward movement. While such a flotation aid helped reduce the overall hydrodynamic drag of the system and induced positive buoyancy, it suffered from several undesired drawbacks. The syntactic foam flotation aid increased the overall size of the system, yet because it was external to the pressure-resistant housing, it did nothing to increase the useable storage space for instrumentation. Even worse, the flotation aid was prone to inadvertent detachment from the housing due to strain induced by the locomotion of the host animal. Certain species of sharks and dolphins, for example, perform highly hydrobatic maneuvers that could detach the flotation aid used in prior systems.

Earlier designs also suffered from drawbacks in the way in which the primary components of the housing were held together. The forward surface of the cylindrical housing was a generally hemispherical or dome-shaped nose cone of about the same diameter as the cylindrical housing. The nose cone incorporated a translucent view port through which a video camera or other similar image-capturing device, affixed generally in alignment with the longitudinal axis of the cylindrical housing, could obtain images. In prior designs, the nose cone was secured to the housing by straps running the length of the housing and terminating in snap hasps that secured the nose cone in place. This means for securing the nose cone to the housing compromised the physical integrity and thus pressure resistance of the system. It could apply only limited compressive force to seal the two components to one another and the snaps were easily damaged. Moreover, the straps and snap hasps also added undesired hydrodynamic drag to the system.

Harnessing an animal-borne instrumentation housing to its host presents further challenges. A well-known device used to attach instrumentation to wild animals, such as sharks and whales, is the FLOY tag, a barb-like stainless steel pin that penetrates the host's flesh and remains imbedded in the host long after the instrumentation is detached from the externally-protruding portion of the FLOY tag. Ethical concerns often inhibit the use of invasive devices, particularly in connection with endangered or threatened species which would otherwise stand to reap many potential benefits from knowledge attained using animal-borne instrumentation systems. Simple suction cups molded from a resilient is compound such as rubber impart little or no harm to the host and have been employed with a small degree of success under certain conditions. However, simple suction cups do not create a sufficient internal vacuum to hold an instrumentation system to the host for more than a short time. Moreover, simple suction cups are easily detached by the host's hydrobatic maneuvers or its contact with other animals or objects.

Thus, there exists a continuing need for an animal-borne instrumentation system having low hydrodynamic drag, positive buoyancy and a sturdy construction. The system should also minimize the potential interference with the host's health, mobility and lifestyle.

SUMMARY OF THE INVENTION

The present invention provides an improved animal-borne instrumentation system having an integrated tail assembly that reduces hydrodynamic drag while inducing positive buoyancy and providing increased useable space for instrumentation storage. The system is also robust due to its sturdy construction which simultaneously improves pressure resistance and eliminates drag-inducing external fasteners. Also provided are improved means for securing the housing to a host which incorporate a fail-safe burn wire system to facilitate detachment of the system from its host after use.

The instrumentation system of the present invention comprises an improved submersible, pressure-resistant housing and means for harnessing the housing to an animal under study. The housing has a cavity disposed within it for storing instrumentation useful for studying the host, its habitat or both. The present invention provides a hydrodynamically advantageous, integrated tail assembly that allows for a contiguous cavity spanning internally from the tail assembly to the nose assembly, thus increasing both buoyancy and the useable volume available for on-board equipment while providing a robust design. The system permits the selection of any combination of instrumentation or other gear fitting within its cavity to be secured to a free-ranging animal, thereby enabling observation and documentation of the animal's life history free from the influence of a human observer. The system may optionally accommodate additional instrumentation attached to the external portion of the housing, such as a hydrophone, which can be electrically connected to instrumentation mounted inside the housing by wiring passing through one or more optional pressure-resistant feed-through bored through the housing.

The system may be attached to any land-borne animal of sufficient size to support the weight of the system, however, the system may optionally be hermetically sealed to permit the system to carry equipment underwater when affixed to an aquatic animal. The amount of instrumentation or other gear the system can support is limited only by the size of such equipment in relation to the cavity in which it is stored, and by the weight of the overall system in relation to the capabilities of the host. Thus, multiple embodiments of the invention will be apparent to those of skill in the art as dictated by the animal under study and its habitat. Generally, however, aquatic species will typically carry integrated recording devices that capture images and other data within a water-tight, pressure-resistant housing, while terrestrial species will typically carry telemetering devices that transmit images and other data to a remote location where they are recorded. In certain circumstances, terrestrial species might carry integrated data recording devices, either in addition to or in lieu of telemetering devices, as warranted by the specific host, the research objective, transmission-inhibiting terrain or any other compelling factor.

The system of the present invention achieves positive buoyancy under water by integrating adequate buoyant volume into the unoccupied portions of the cavity disposed within the housing, unlike prior systems which required the addition of unreliable flotation aids external to the housing to maintain positive buoyancy. Systems operating underwater are shaped to minimize hydrodynamic drag to the extent practicable so as not to interfere with the host's locomotion.

While the housing may be secured to the host using any means known in the art, improved means for securing the housing to the host are revealed here. A fin attachment means is provided for use on species having a fin sufficient to support the hydrodynamic drag of the system. For example, the dorsal fin of most sharks is well-suited for use of the fin attachment means of the present invention. For species having an outer dermal layer conducive to the application of a suction device, a vacuum-assisted suction attachment means is also provided.

It is desirable for the housing to detach from its host after the lapse of a predetermined time period or upon the receipt of an appropriate command from the on-board equipment or a remote operator. Accordingly, means for securing the housing to a marine host preferably include a burn-wire system comprised of a partially un-insulated, electrically-conductive wire which disintegrates when electric current is applied across the wire and an electrode separated from one another by the surrounding salt water. A galvanic reaction corrodes, or dissolves, the wire upon the application of sufficient electric current, thereby releasing the housing. The burn-wire system is made fail-safe by the inclusion of a release pin made from magnesium, or any other suitable material, which corrodes after a known, calibrated period of exposure to salt water and thereby releases the housing from the host upon sufficient dissolution of the pin. The time required for the pin to dissolve and release the housing is proportional to the mass of the pin and the galvanic potential of the material, thus allowing for variability as desired. Systems suitable for use on terrestrial or fresh-water hosts should alternatively employ a mechanical squib release which releases the housing upon the receipt of an appropriate command in lieu of the burn-wire system.

BRIEF DESCRIPTION OF THE DRAWINGS

FIG. 16 is a circuitry diagram showing instrumentation for powering a camera, a photomultiplier, light-emitting diodes and a tape recorder.

DETAILED DESCRIPTION OF THE PREFERRED EMBODIMENT

Figure 1:
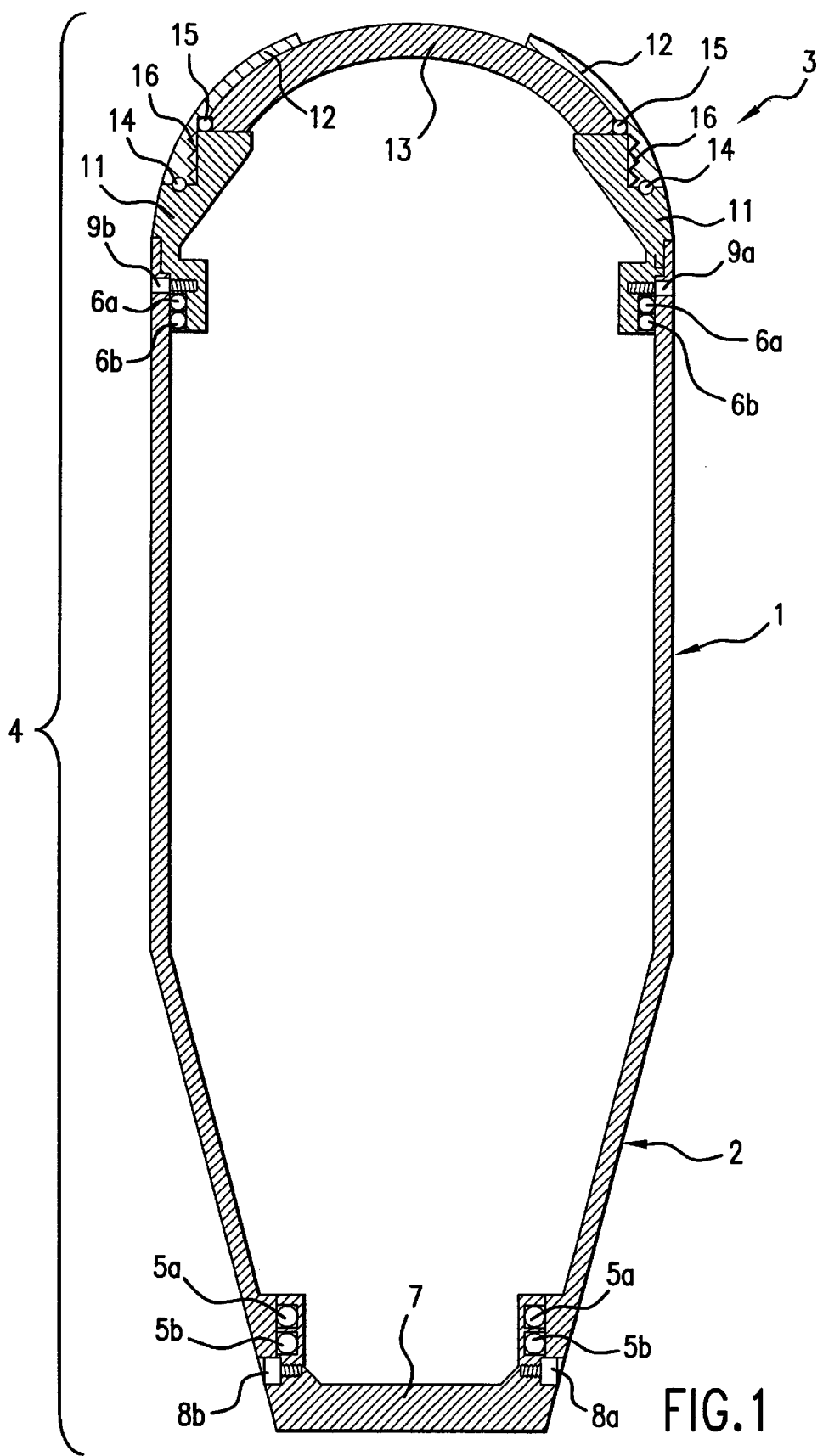
FIG. 1 is a cross-sectional side view of a housing having a generally cylindrical body and a truncated tail assembly terminating in a removable access plate.
Figure 2:
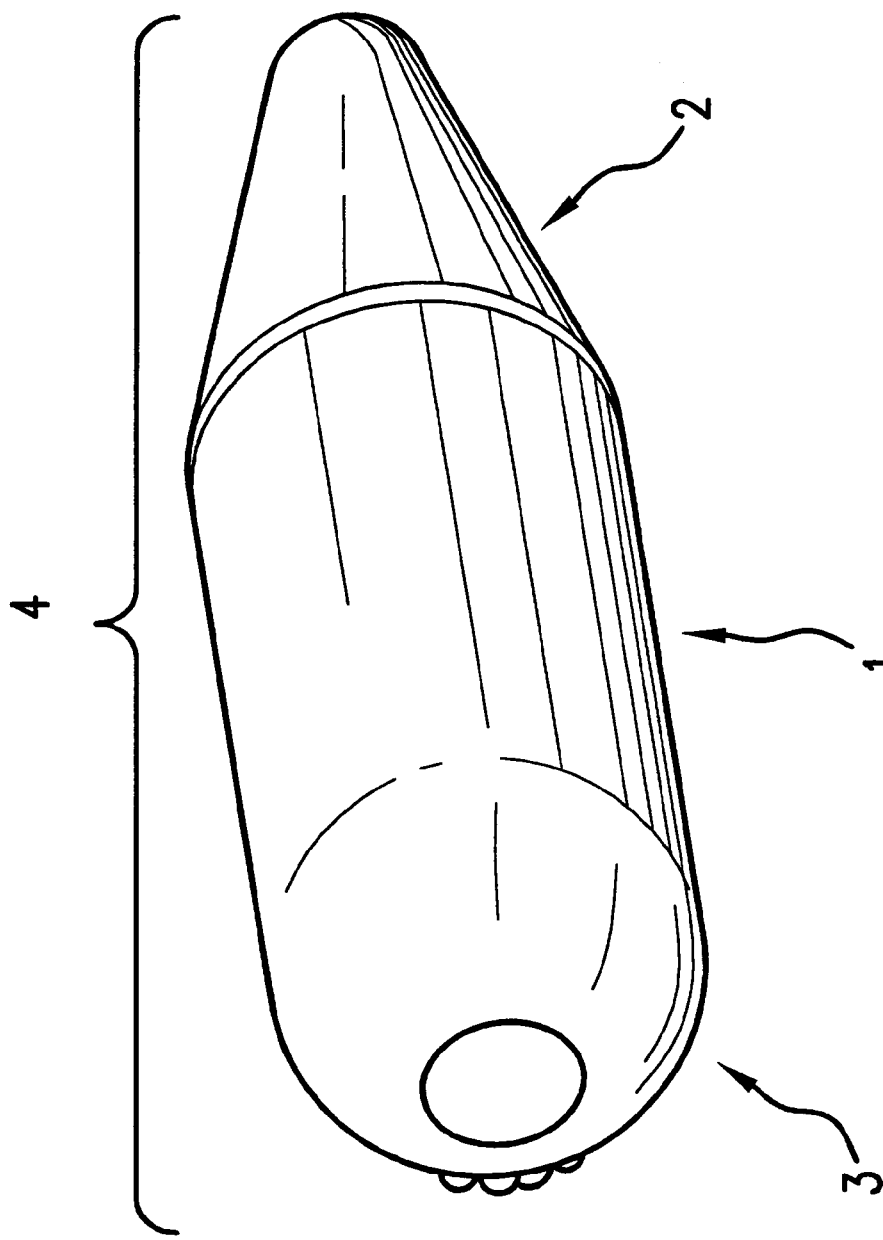
FIG. 2 is a perspective view of a housing depicting a translucent viewport in the nose assembly encircled by a ring of infrared light-emitting diodes for providing illumination.

With reference now to the drawings and in particular FIGS. 1–9 thereof, a new and improved animal-borne image and data logging system embodying the principles and concepts of the present invention and generally designated by the reference numeral 4 will be described.

The system of the present invention comprises body 1 having tail assembly 2 at one of its ends and nose assembly 3 at its opposing end. Together tail assembly 2, body 1 and nose assembly 3 form housing 4 which has a cavity disposed within it for storing instrumentation and other gear. Housing 4 of the present invention is sealed to protect the equipment within it from the natural elements, most notably water, although housing 4 also prevents sand, dirt and other particles from entering the cavity and contacting the equipment contained within housing 4 if the system is operated out of the water. All components comprising housing 4 are adequately coupled and sealed such that housing 4 is submersible and pressure-resistant to a desired depth under normal operating conditions. The shape of housing 4 varies by embodiment and is selectively designed as a compromise among weight, pressure tolerance, robustness and hydrodynamic drag. The weight of housing 4 is a concern primarily in systems operating out of water, and should be such that the mobility of the host is not significantly impaired. Pressure tolerance should be adequate for the maximum intended depth of the system. A robust, sturdy construction commensurate with the demands of the host should be employed. Hydrodynamic drag should be as low as practicable. Ease of construction is also a factor, but to a lesser degree, as housing 4 of the present invention readily allows the use of numerous construction methods apparent to those of ordinary skill in the art. For example, housing 4 can be machined from a solid block of material, cast as a single assembly or assembled from separately-formed components. Preferably, tail assembly 2 and body 1 of housing 4 are formed from one continuous, unitary block of material, however, tail assembly 2 and body 1 may alternatively be formed separately and coupled at an interface with two concentric o-rings 5a and 5b disposed between the two components at the interface to create a reliable water-resistant seal. Nose assembly 3 and body 1 should preferably be coupled to one another at an interface likewise incorporating two concentric o-rings 6a and 6b to create a reliable water-resistant seal.

Figure 3:
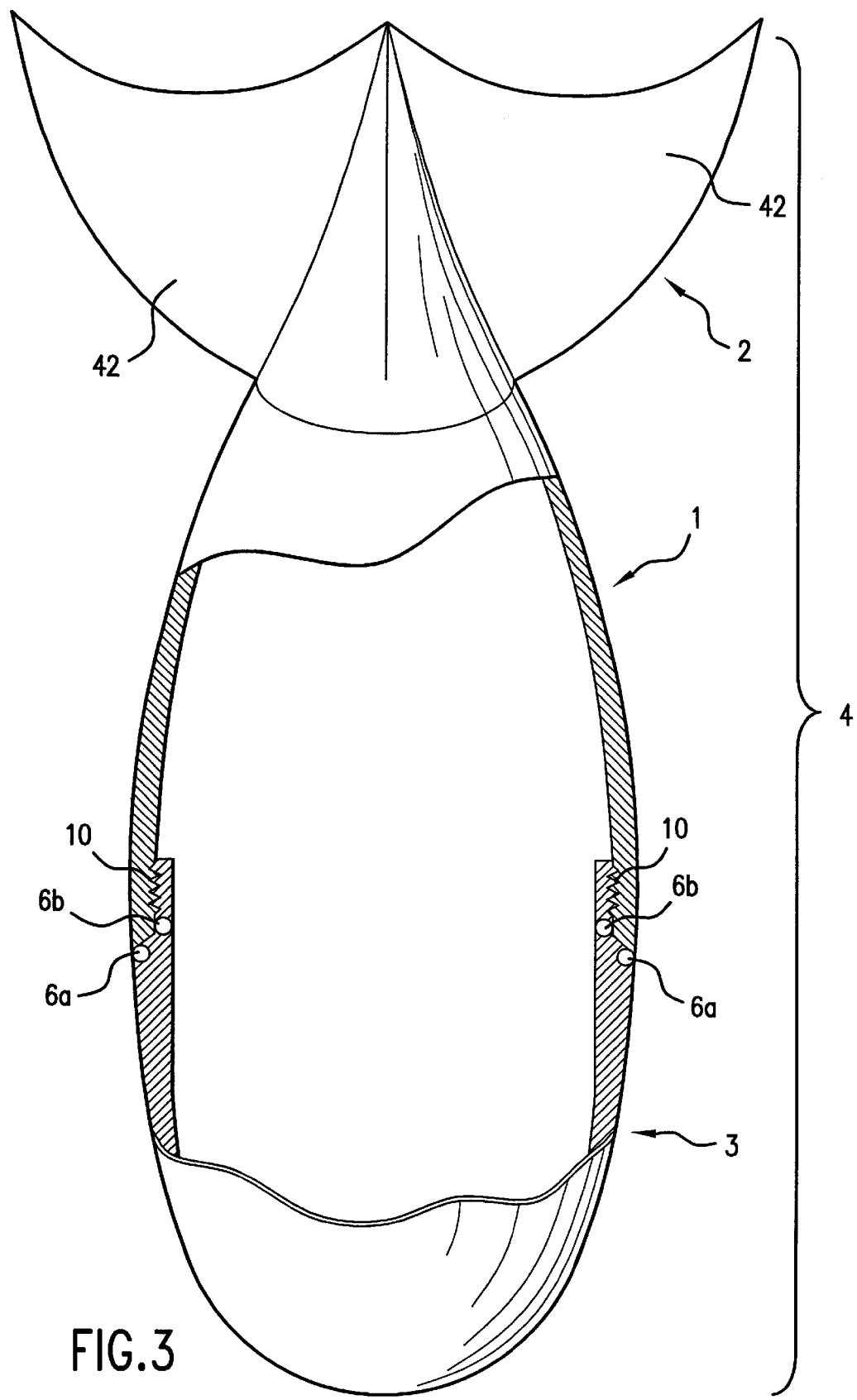
FIG. 3 is a cross-sectional side view of a housing having a highly streamlined body and stabilizing fins.

According to one embodiment of the present invention, body 1 of housing 4 has a generally cylindrical shape with its longitudinal axis being generally aligned with the host's normal direction of forward movement. For a cylindrical body, the optimal hydrodynamic aspect ratio is achieved at a length to diameter ratio of about 3:1. Preferably, tail assembly 2 tapers away from body 1 while nose assembly 3 is generically hemispherical. In a system having a cylindrical body and a tapered tail assembly, a taper of 14° from a line parallel to the external surface of the cylindrical body to the tapered section of the tail assembly is preferred for achieving optimal hydrodynamics. In an alternative embodiment of the present invention, the overall shape of housing 4 can be selected in such a manner that characteristics such as pressure resistance or hydrodynamic performance are optimized for a particularized application. Such an embodiment is generally depicted in FIG. 3.

Tail assembly 2 is coupled to body 1 in any manner that provides a secure connection. In one embodiment of the present invention, tail assembly 2 is generally conical in shape such that it tapers as it extends away from its connection with body 1. A tail assembly generally conical in shape combines reasonable pressure resistance for a given mass of material and acceptable hydrodynamic characteristics with a shape that is relatively easy to construct, although alternative embodiments could employ a tail assembly with a curved taper to reduce hydrodynamic drag and increase storage capacity within the cavity. According to an alternative embodiment of the present invention, tail assembly 2 terminates in removable access plate 7 which permits access to the instrumentation contained within housing 4. Optional removable access plate 7 is coupled to tail assembly 2 at an interface having two concentric o-rings 5a and 5b disposed between the two components and a plurality of retaining screws 8a and 8b securing the two components. It is preferable to include one or more retaining screws, such as retaining screws 8a and 8b, at each sealed interface in a direction generally normal to the external surface of housing 4 in order to inhibit disengagement of the coupled components. Retaining screws, such as retaining screws 8a and 8b, preferably do not extend beyond the external surface of housing 4, thereby preserving the hydrodynamic profile of the system. While only two such retaining screws 8a and 8b are shown in the cross-section of FIG. 1, it is to be understood that any suitable number of such screws may be employed. For systems in which it is desirable to disconnect tail assembly 2 from body 1, tail assembly 2 is preferably connected to body 1 at a disengageable interface such that the two components are securely engaged with one another to form a water and pressure-resistant seal, and then locked in place with a plurality retaining screws (not shown). Nose assembly 3 is also coupled to body 1 at an interface having two o-rings 6a and 6b disposed between the two components and secured by a plurality of retaining screws, such as retaining screws 9a and 9b. Four such retaining screws are preferred. Tail assembly 2 may be integral with body 1 or alternatively may be coupled to body 1 in any manner that provides a secure connection, such as the manner described for connecting nose assembly 3 to body 1. All o-rings, such as o-rings 5a, 5b, 6a, 6b, should be o-ring gaskets formed of a resilient material such as rubber to ensure pressure tolerance. Although nose assembly 3 and tail assembly 2 may be coupled to body 1 at an interface employing retaining screws, it should be understood that any sufficient interface may be employed, including an interface such as threaded interface 10 shown in FIG. 3. Optional removable access plate 7 may also be secured to tail assembly 2 in any manner sufficient to form a pressure-resistant interface, including a threaded interface (not shown). According to the preferred embodiment of the present invention, tail assembly 2 and body 1 are formed of a unitary block of material, such that no additional connection between the two components is required, as depicted in FIG. 1.

Nose assembly 3 comprises dome base 11, retaining ring 12 threadingly coupled to dome base 11, and viewport 13 secured to dome base 11 by the compressive force applied by retaining ring 12. Dome base 11 is coupled to body 1 at an interface having concentric o-rings 6a and 6b disposed at the interface to enhance pressure-resistance and secured by a plurality of retaining screws, such as retaining screws 9a and 9b. Although two such retaining screws 9a and 9b are shown at the interface of dome base 11 and body 1 in FIG. 1, it should be understood that any suitable number of retaining screws may be employed, but four are preferred. At the interface between retaining ring 12 and dome base 11 is o-ring 14 which enhances pressure-resistance. At the interface between viewport 13 and retaining ring 12 is o-ring 15 which enhances pressure-resistance.

Housing 4 may be constructed of any rigid material of suitable strength and corrosion-resistance, such as plastic, aluminum, titanium or composite materials. A stronger material permits the system to withstand greater pressures, and hence, greater depths. The material used to construct housing 4 is selected based on its ability to provide sufficient strength to withstand the pressures typically encountered by the species under study. However, a system of excessive size or weight will limit the species appropriate for study. Therefore, because the amount of material used in the construction of housing 4 affects not only its strength, but also its size and weight, consideration is given to each of these tradeoffs when selecting materials and dimensions for housing 4. Typical aluminum housings weighing approximately 1.5 kg in air withstand pressures up to 1500 psi, corresponding to an underwater depth of approximately 1000 meters. Typical titanium housings weighing approximately 4.5 kg in air withstand pressures up to 3500 psi, corresponding to an underwater depth of approximately 2000 meters.

Once under water, weight is less of a concern than buoyancy. Systems intended for underwater operation require positive buoyancy sufficient to cause housing 4 to float to the surface of the fresh, salt or brackish water in which they operate after detaching from the host. This facilitates recovery of housing 4 and the equipment contained therein, and the system may be re-used as desired. As described more fully below, an on-board radio beacon or ultrasonic transducer which emits a signal allowing the system to be retrieved by triangulation may be included among the equipment conveyed by housing 4. To achieve positive buoyancy, portions of the cavity not occupied by equipment fill with ambient air to give the systems adequate buoyancy to overcome the weight of the system itself.

System Deployment

Housing 4 may be secured to its host by any standard means known in the art for outfitting animals with instrumentation. Each attachment means should be speciesspecific and, to the extent practicable, should be selected to minimize animal handling, irritation and disturbance; to optimize data collection; to minimize hydrodynamic drag; and to be as unobtrusive as possible once deployed. Depending on their species, hosts are either captured or tagged remotely. Small pinnipeds, sea turtles, some sharks and narwhal can be captured and detained during deployment of the system. Other sharks and sperm whales can normally be tagged remotely without capture by disengagingly attaching the system to one end of a pole approximately twenty (20) feet in length. Larger pinnipeds are generally sedated during the 15 to 30 minute deployment procedure. Blood, tissue, milk and/or other samples can be taken by collaborating scientists to optimize data return on any given animal handling.

Figure 7:
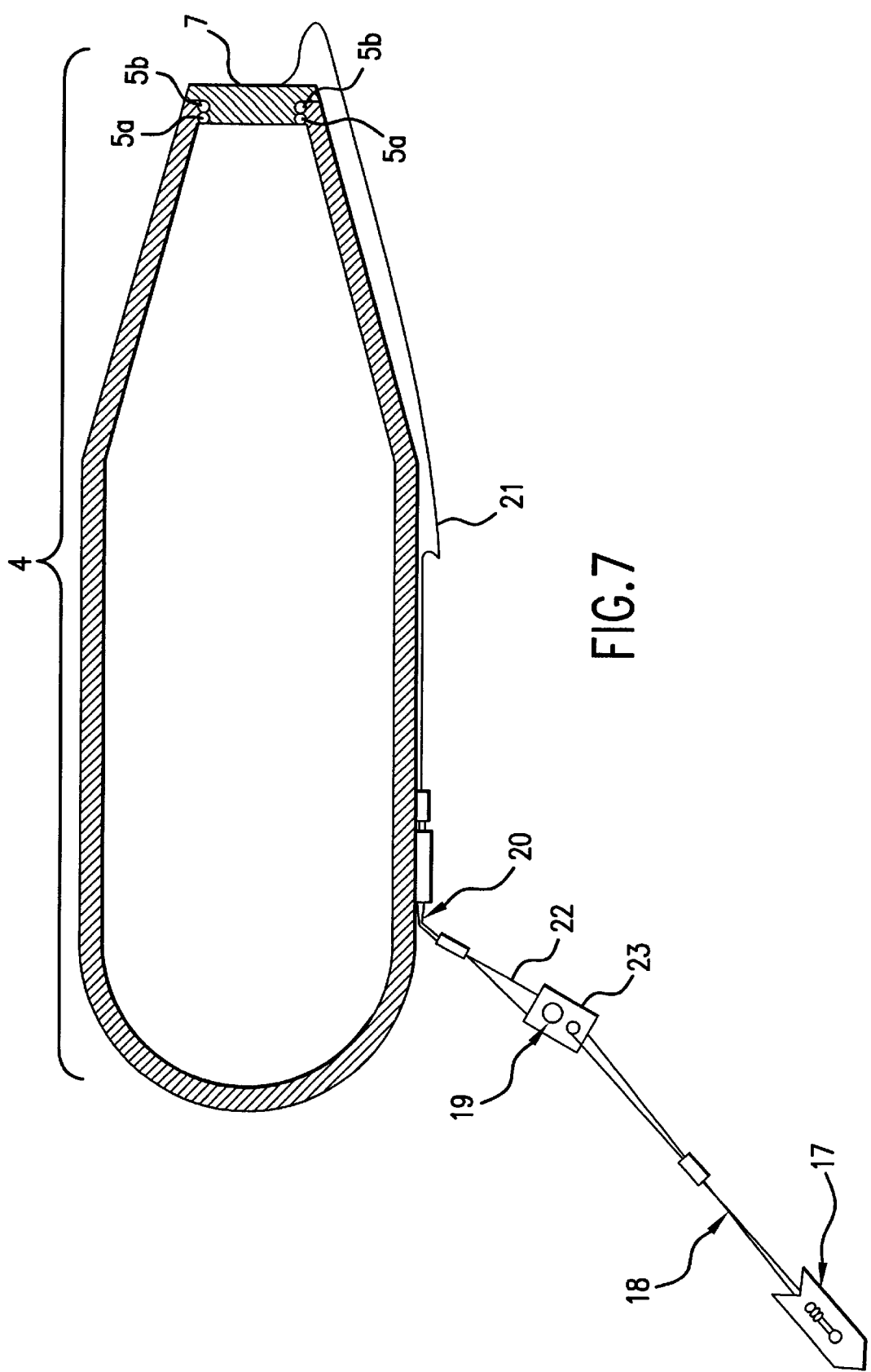
FIG. 7 is a detailed view of a burn-wire release system.

The system of the present invention is usually positioned on the host's dorsum, behind the head, with viewport 13 being translucent and facing the host's normal direction of forward motion. Common five and ten minute epoxies are generally used to affix a mount (not shown) on pinnipeds and turtles to which the housing is secured. Stainless steel tags, such as FLOY tag 17, can be used to deploy housing 4 on sharks. When employing a stainless steel tag such as FLOY tag 17, tether 18 formed of a thin stainless steel leader wire of approximately 200 lb. test should be used to secure housing 4 to FLOY tag 17 as depicted in FIG. 7. Junction box 23 allows for insertion of tether 18 and pin 19. Tether 22 is also formed of a thin stainless steel leader wire of approximately 200 lb. test strength. Tether 22 loops around pin 19 and burn-wire 20. Pin 19 is made of magnesium or any other suitable material, which corrodes after a known, calibrated period of exposure to salt water, thereby allowing tether 22 to disengage from junction box 23 and allow housing 4 to detach from its host. Burn-wire 20 is described more fully below. Likewise, a tether should preferably be used to secure housing 4 to any mount where it is desired to isolate or dampen the host's movement from that of housing 4, thereby allowing for added stability during image-capturing. Whenever a tether is used in the deployment of housing 4, housing 4 should preferably be hydrodynamically stabilized by the addition of stabilizers to the housing such as fins 42 depicted on tail assembly 2 in FIG. 3.

Figure 5:
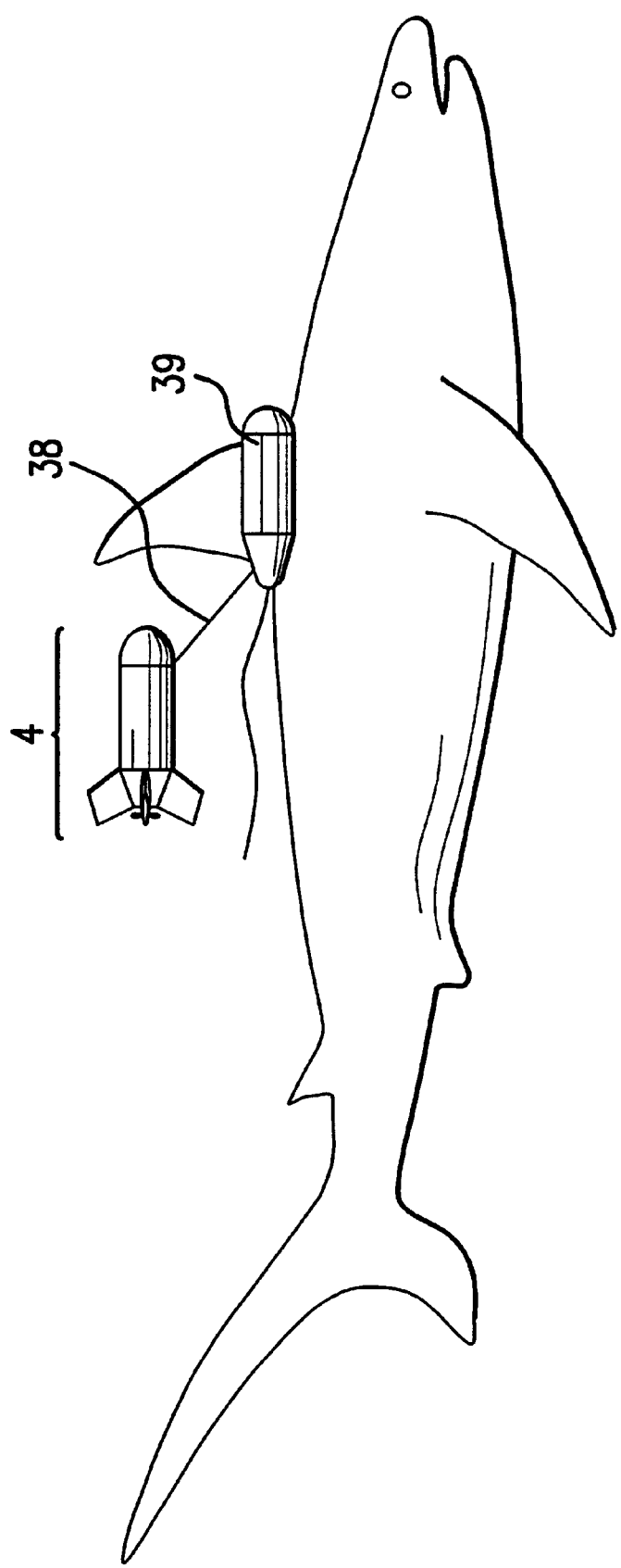
FIG. 5 is a side view of a tethered unit.
Figure 6:
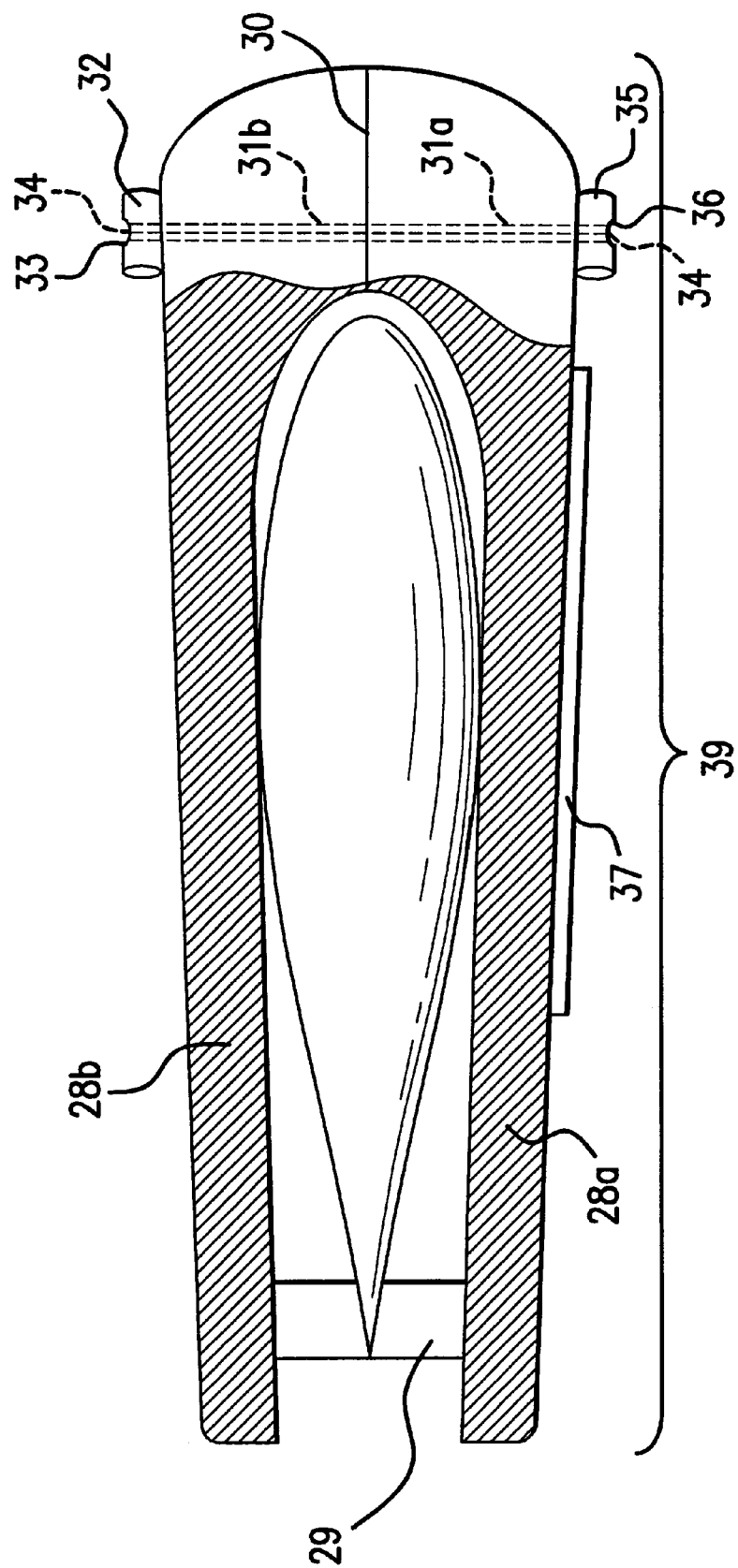
FIG. 6 is a cross-sectional top view of a fin attachment means for securing a housing (not shown) to a host.

Also useful for securing housing 4 of the present invention or any other instrumentation to an animal is an improved fin attachment means which removeably secures housing 4 to the dorsal or pectoral fin of an aquatic host of suitable size for such deployment. Referring to FIG. 6, fin attachment means 39 of the present invention to which housing 4 is affixed comprises coupler 29 and two opposing leafs 28a and 28b which compressingly engage the proximal end of the host's dorsal or pectoral fin (shown in the central portion of FIG. 6 although not an element of the present invention). Leafs 28a and 28b are flexibly joined to one another beyond, and slightly beneath, the rearward edge of the fin by coupler 29 which biases leafs 28a and 28b away from one another. In lieu of coupler 29, leafs 28a and 28b may alternatively be joined directly to one another as long as opposing bias is maintained. At their opposing ends, leafs 28a and 28b meet interface 30. Leafs 28a and 28b each have roughened interior surfaces, preferably by the application of a coating of slip resistant material, which engage opposing sides of the host's fin. Bores 31a and 31b extend generally perpendicular through interface 30 to provide entrances in the distal surfaces of each of leafs 28a and 28b. Pins 35 and 32 each have a notch, shown in FIG. 6 as reference numerals 36 and 33, respectively. Pins 35 and 32 lie adjacent to the entrances provided by bores 31a and 31b, respectively. Burn-wire 34 has two ends and travels through bores 31a and 31b. At one of its two ends, burns wire 34 loops around pin 32 to engage notch 33 and then travel back into bore 31b where it is secured to itself. Similarly, the other end of burn-wire 34 loops around pin 35 to engage notch 36 and then travel back into bore 31a where it is secured to itself. Burn-wire 34 should be sufficiently taught to secure leafs 28a and 28b to one another at interface 30 during the host's movement. Mount 37 is affixed to one of leafs 28a and 28b as well as to housing 4, either directly or by way of a tether. Pins 32 and 35, as well as pin 19, is made of magnesium or any other suitable material, which corrodes after a known, calibrated period of exposure to salt water, thereby allowing burn-wire 34 to release the pressure it applies to secure leafs 28a and 28b at interface 30 such that leafs 28a and 28b separate to disengage the host's fm. Alternatively, if one or both of pins 32 and 35 have not yet corroded, burn-wire 34, as more fully described below, disengages the fin attachment means from the fin upon the receipt of an appropriate command from the on-board equipment or a remote operator. Upon release, housing 4 will float to the surface of the water due to its positive buoyancy where it can be retrieved and re-used. Any embodiment of the present invention employing fin attachment means 39 may have housing 4 securely affixed directly to fin attachment means 39 at mount 37 or alternatively tethered to fin attachment means 39 by tether 38 as depicted in FIG. 5.

Figure 4:
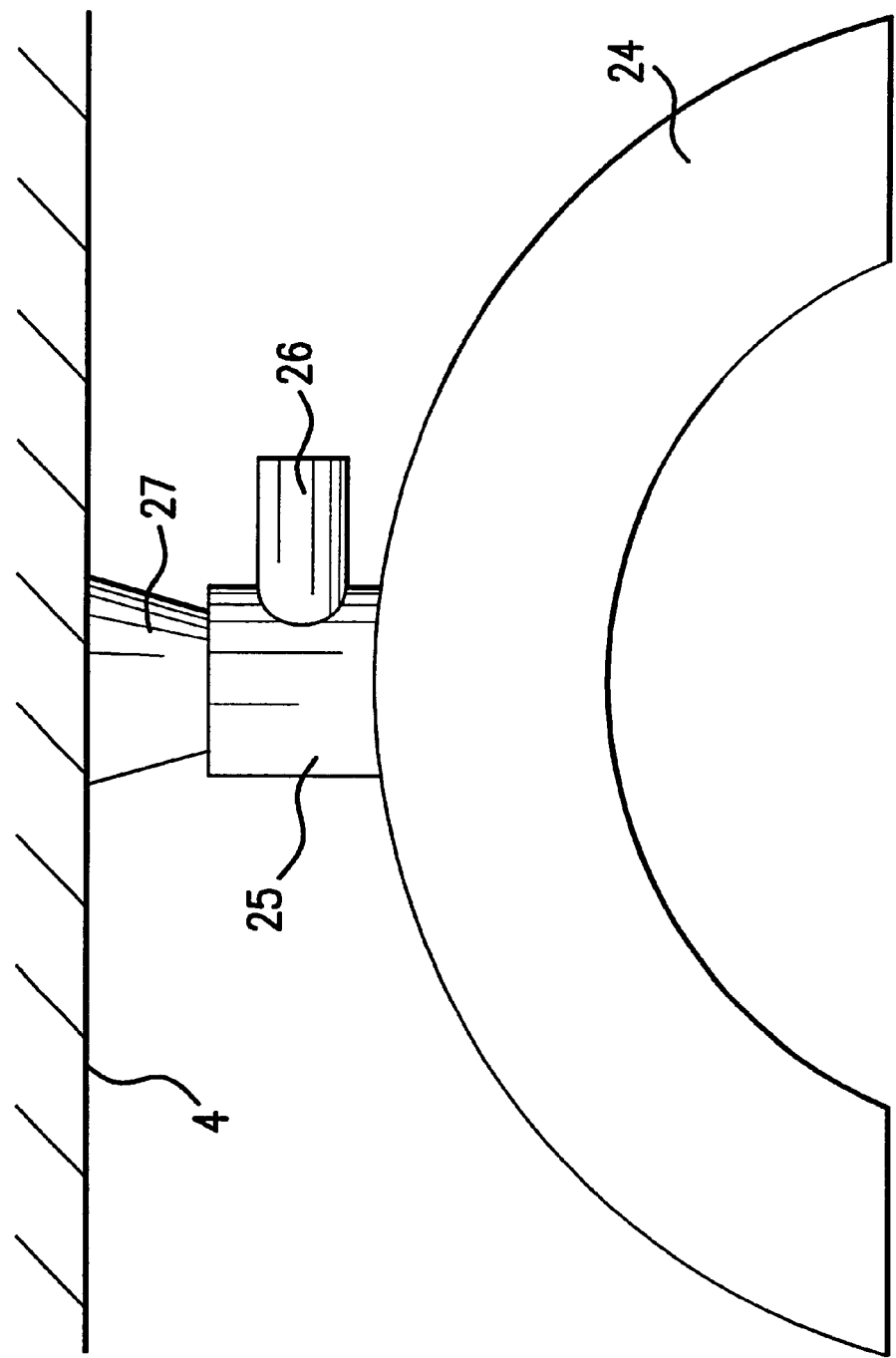
FIG. 4 is a cross-sectional side view of a vacuum-assisted suction attachment means for securing a housing (not shown) to a host (not shown).

A suction cup system may be used as a mount for cetacean deployments. Traditional suction cups made of a resilient material such as rubber have been used with limited success as they tend to lose sufficient internal vacuum to maintain a hold on the host for more than a short period. Accordingly, an improved vacuum-assisted suction attachment means useful for securing housing 4 of the present invention or any other instrumentation to an animal is provided. Referring to FIG. 4, the improved vacuumassisted suction attachment means comprises thin-lipped suction cup 24, one-way valve 25, suction hose attachment 26 and swivel 27. Suction cup 24 is approximately 8 to 10 inches in diameter and made from a resilient material such as rubber. Although any type of rubber suction cup will normally suffice, silicone rubber is preferred. One-way valve 25 is affixed to the convex portion of suction cup 24 and only permits flow out of the internal portion of suction cup 24 through suction hose attachment 26 to which a hose (not shown) is attached to couple one-way valve 25 to a relative vacuum. Swivel 27 has two portions capable of rotation independent of one another, one of which is affixed to one-way valve 25 while the other is affixed to housing 4 (shown in part in FIG. 4). It is preferred that swivel 27 permits pivotal motion as well as continuous rotation about an axis normal to the external layer of the host to which suction cup 24 is secured. A relative vacuum sufficient to boost the internal vacuum of suction cup 24 may be provided by a venturi suction pump which can conveniently be activated by the pressure produced by any common SCUBA tank (not shown). To deploy housing 4 to a host using the vacuum-assisted suction attachment means of the present invention, an operator affixes one end of a hose to a relative vacuum and the other end to suction hose attachment 26. The concave portion of suction cup 24 is applied to the host and the relative vacuum is allowed to evacuate the internal portion of suction cup 24. Once the internal portion of suction cup 24 is sufficiently evacuated, the hose is detached from suction hose attachment 26. Deploying the vacuum-assisted suction attachment means of the present invention in this manner on a whale and evacuating the internal portion of suction cup 24 using a venturi suction pump powered by a common SCUBA tank takes approximately 1.5 seconds in the field.

Due to the nature of the present invention, it is critical to evaluate animal behavior during initial deployments of the system to assess possible impacts of the system on the host's behavior and health. Wherever possible, exploratory tests should be conducted with captive animals prior to field deployment. If anomalous behavior is observed, deployment protocols should be reevaluated and the system reconfigured as appropriate. In many cases it is not practical to pursue controlled test deployments. In such cases, initial field deployments should be short in duration, i.e., as little as one to three hours, in order to assess the host's response while minimizing any possible risks to the host. After several successful short term deployments, targeted sampling may be undertaken with appropriate programmed delays and sampling protocols. In any event, utmost caution should be exercised to ensure that the system does not excessively interfere with the host's behavior or well-being.

INSTRUMENTATION

Figure 10:
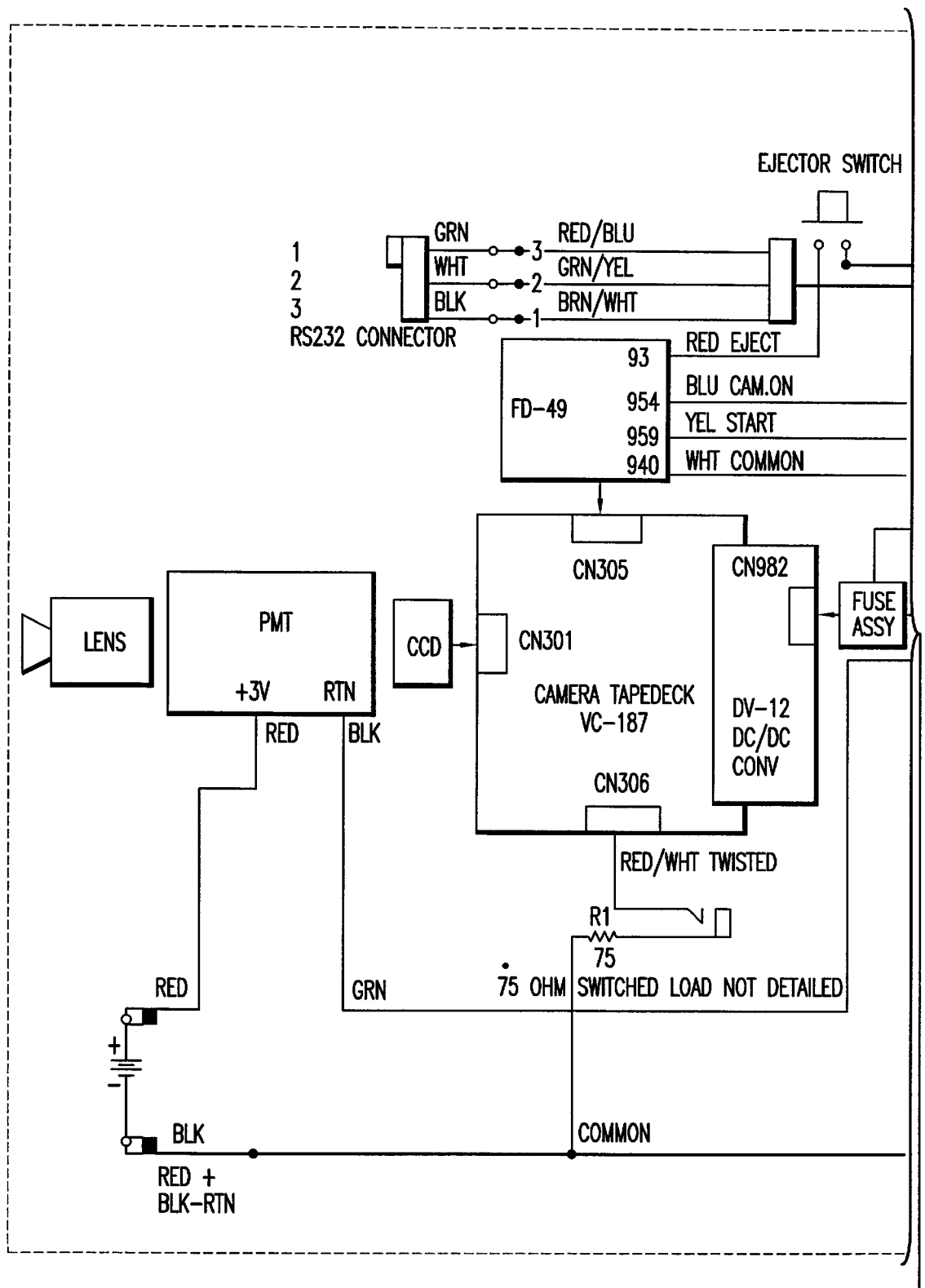
FIG. 10 is a circuitry diagram for deep water instrumentation.
Figure 10A:
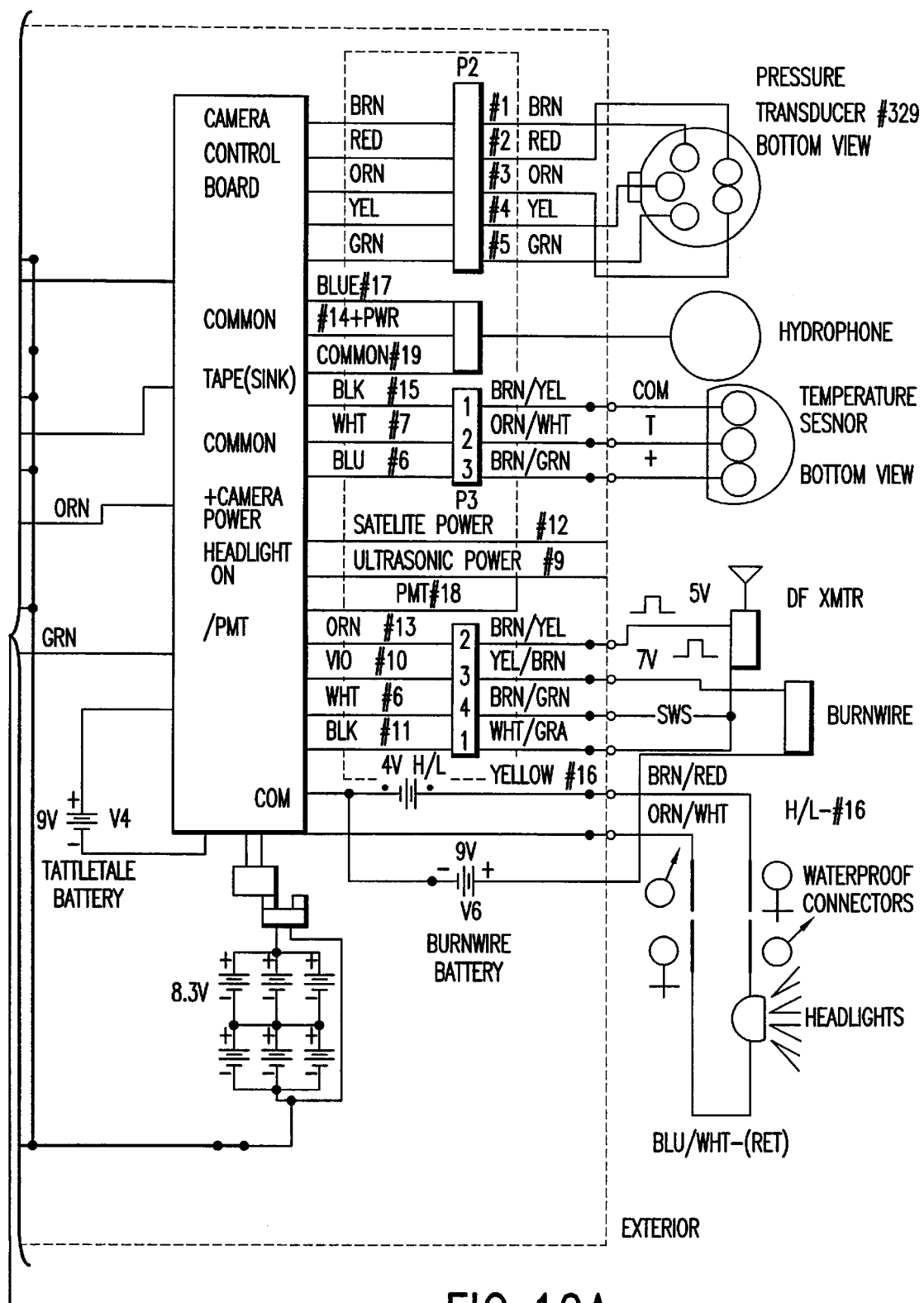
Figure 11:
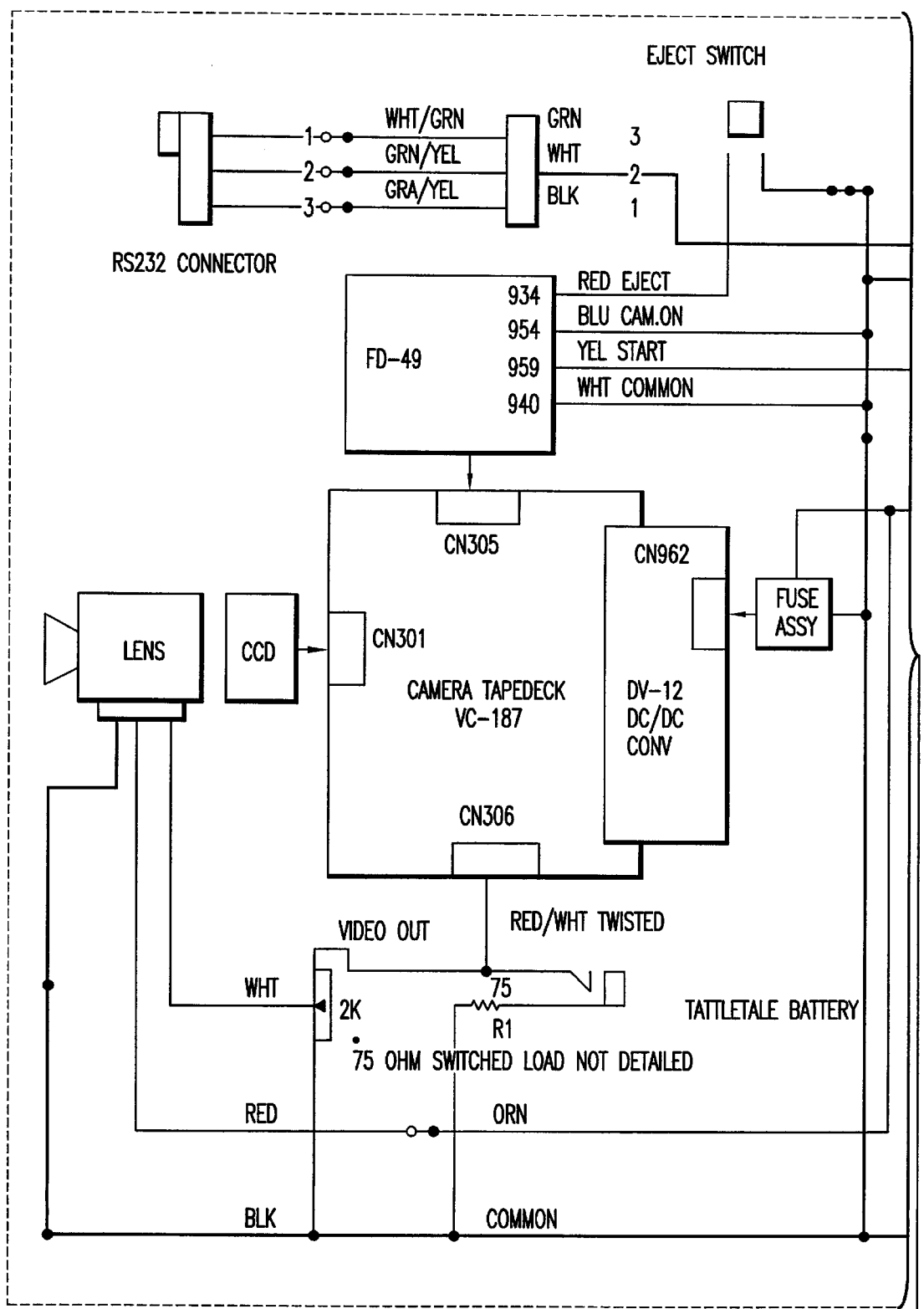
FIG. 11 is a circuitry diagram for shallow water instrumentation.
Figure 11A:
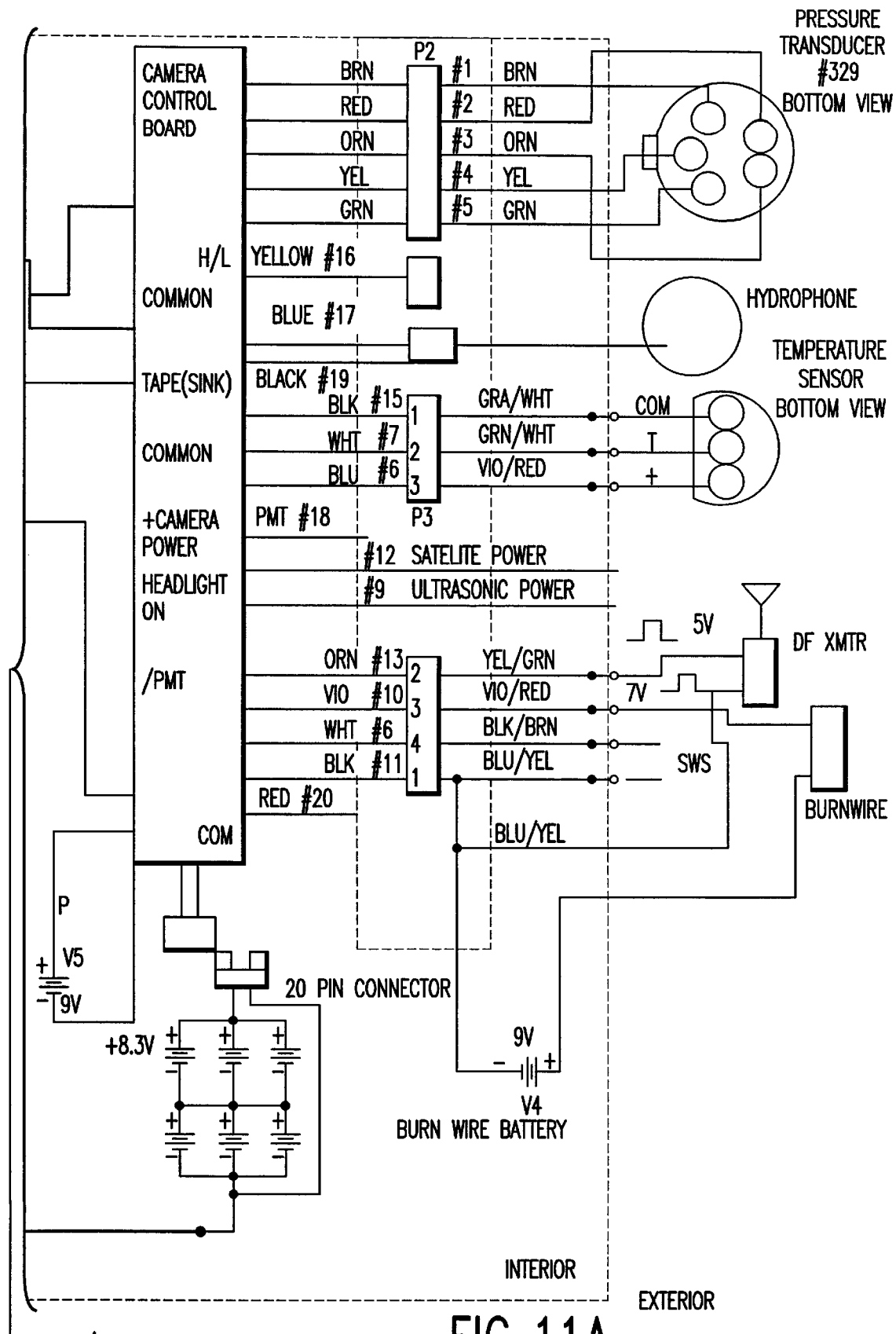
Figure 14:
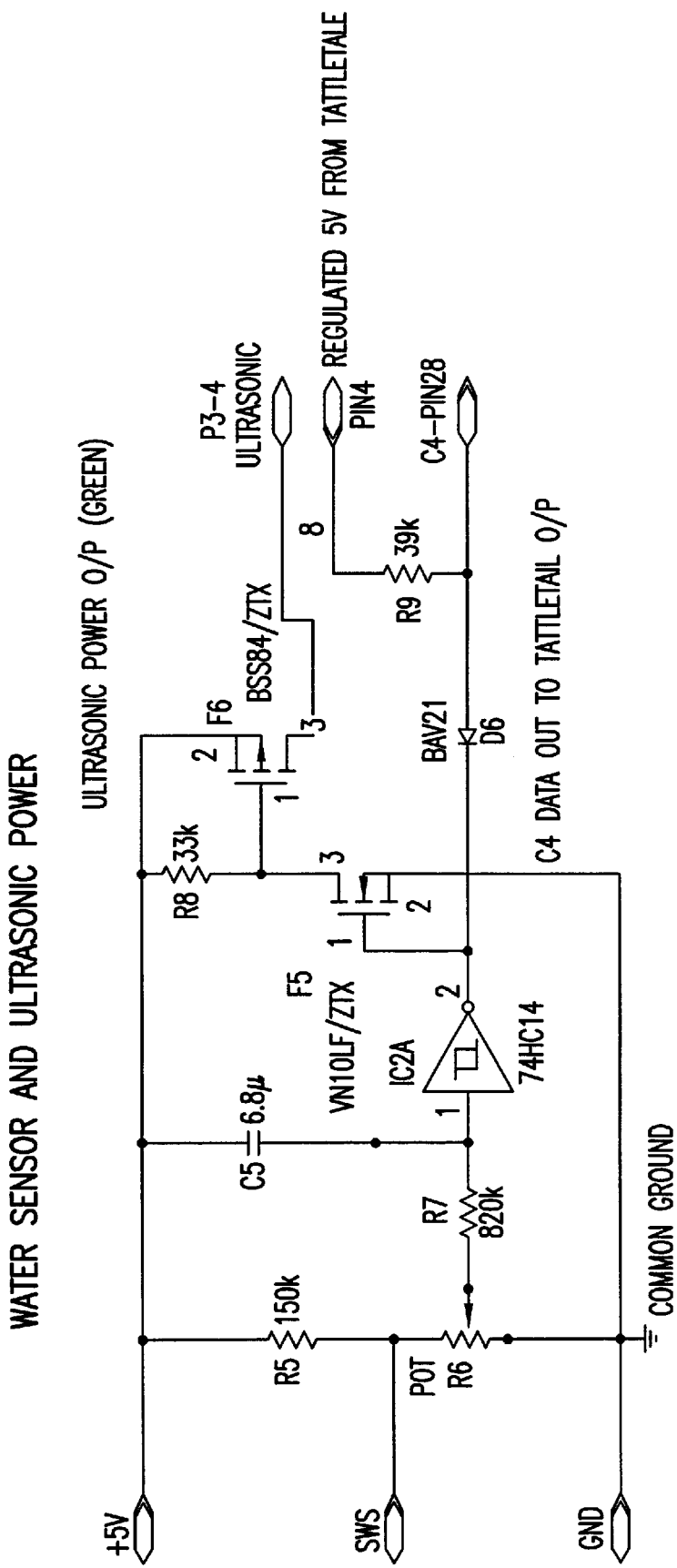
FIG. 14 is a circuitry diagram for water sensor and ultrasonic power instrumentation.
Figure 15:
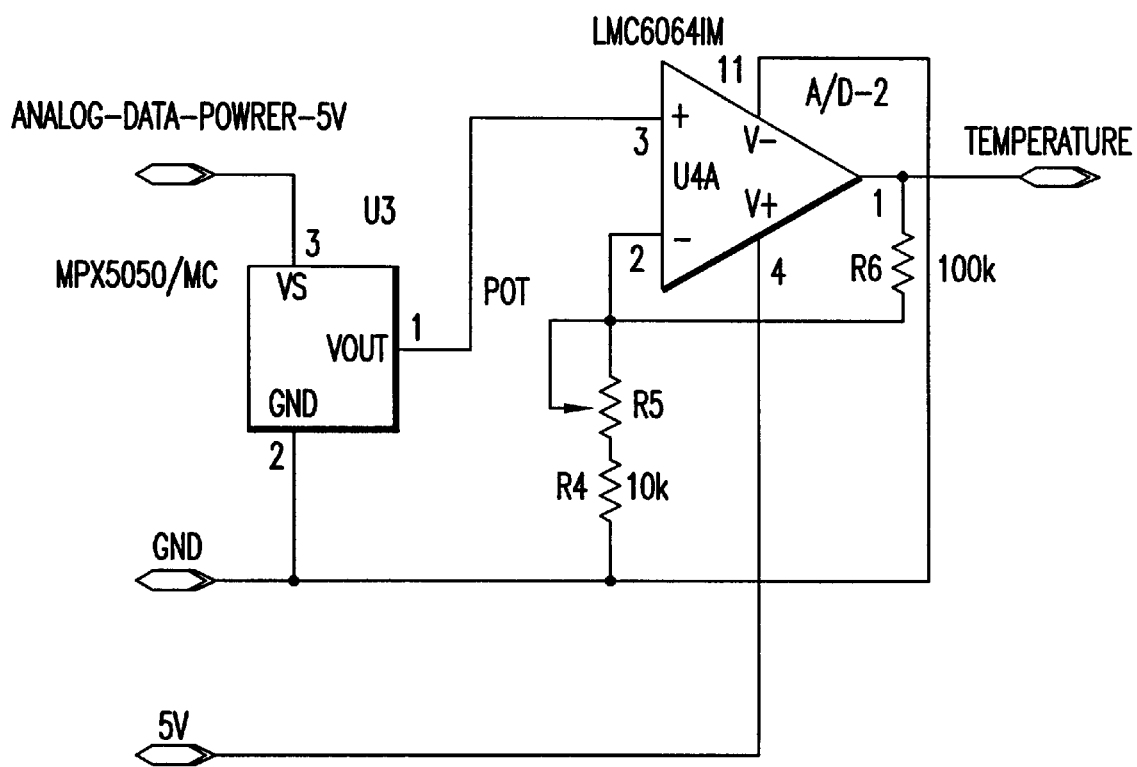
FIG. 15 is a circuitry diagram for temperature-sensor instrumentation.
Figure 18:
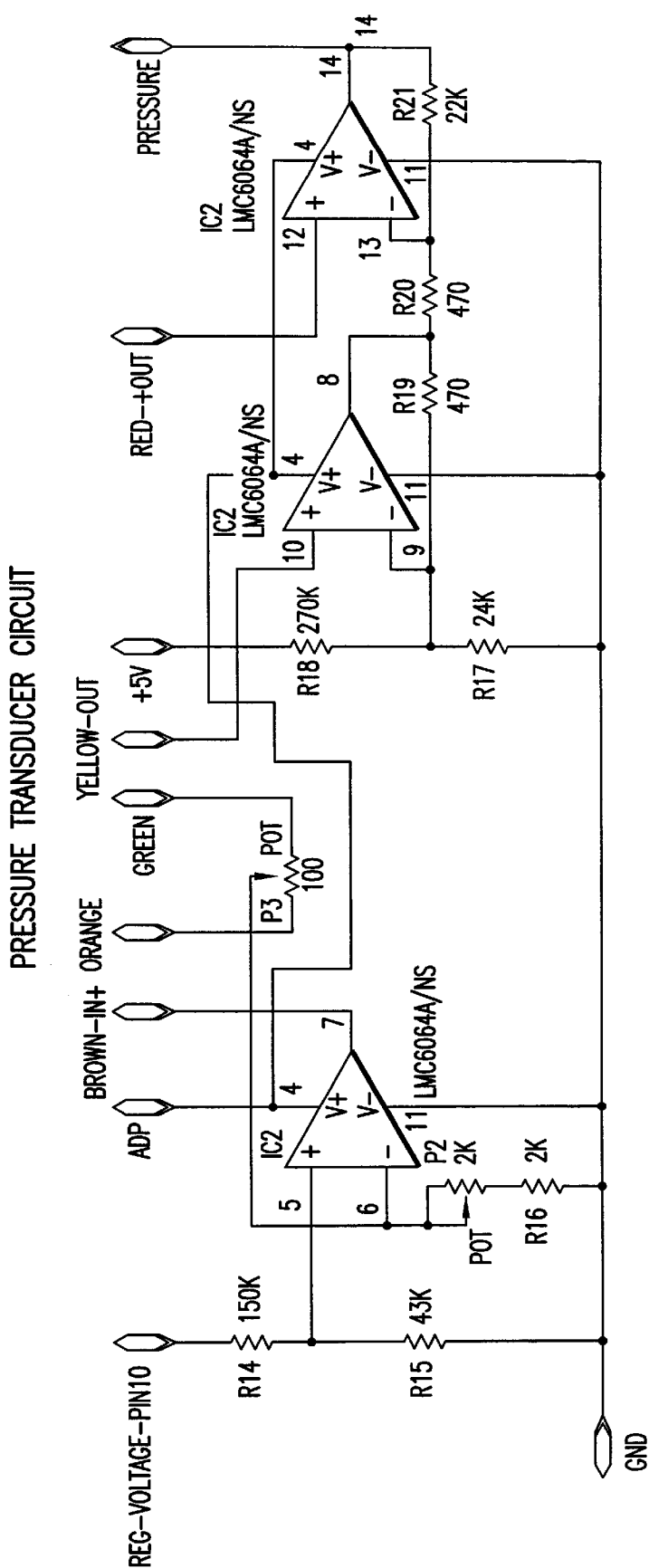
FIG. 18 is a circuitry diagram for pressure transducer instrumentation.

The housing may contain any combination of image and data-logging equipment useful for obtaining information about the host or its habitat, as well as other gear necessary to support such equipment. Such instrumentation may perform any combination of functions such as acquiring, recording and transmitting data or images; power cells; a radio beacon or ultrasonic transducer for locating the system by triangulation; global-positioning-system tracking and recording devices; a radio receiver for receiving commands sent by a remote operator; circuitry to operate a burn-wire system; and a microcomputer or microcontroller to integrate the operation of various such subsystems and to otherwise respond in a pre-programmed manner to various sensory inputs and remote commands. The system may also incorporate instrumentation useful for obtaining information about the host's environment, such as a hydrophone, a microphone, temperature sensors, depth sensors and the like. Housing 4 may optionally comprise one or more pressure-resistant feed-throughs (not shown) which permit wires or other components to pass through housing 4. A circuitry diagram for a typical system deployed on a deep-diving host is depicted in FIG. 10, while FIG. 11 depicts a circuitry diagram for a typical system deployed on a shallow-diving host. Many useful subsystems are described in the following paragraphs, although those of skill in the art will readily recognize that the system may be used to deploy a virtually unlimited variety of instrumentation or other gear, limited only by the size and weight of the collective subsystems in relation to the host. By way of example only, a circuitry diagram for a typical water sensor and ultrasonic power installation is depicted in FIG. 14; a circuitry diagram for a typical temperature sensor is depicted in FIG. 15 and a circuitry diagram for a typical pressure transducer is depicted in FIG. 18.

BURN-WIRE RELEASE MECHANISM

Figure 19:
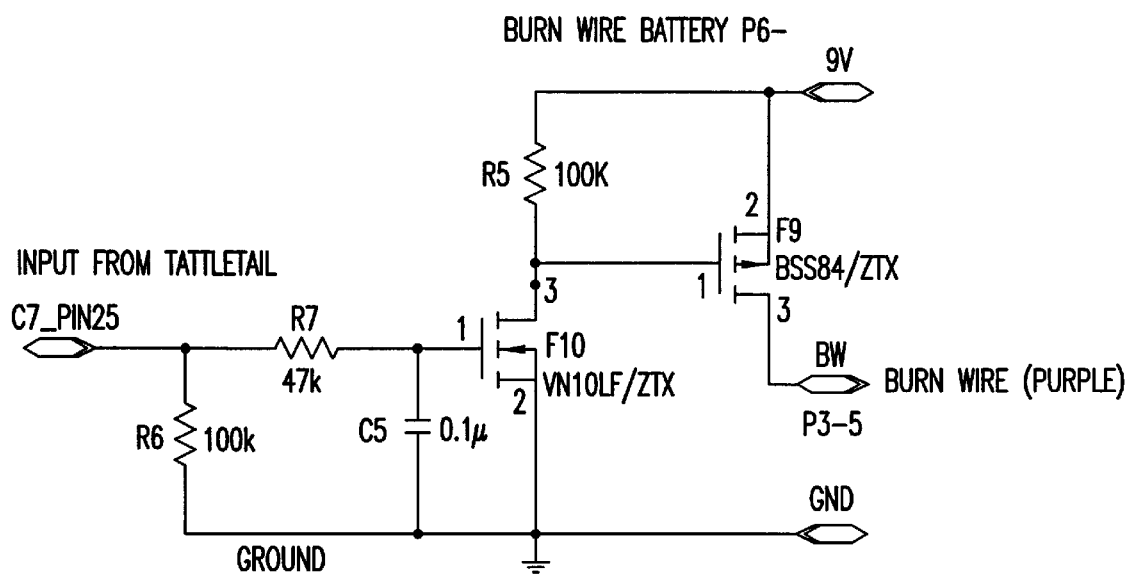
FIG. 19 is a circuitry diagram for instrumentation actuating a burn-wire release mechanism.

Systems of the present invention can be released at a pre-programmed time or, if the system is equipped with an optional receiver, upon the receipt of an appropriate actuating command from a remote operator. A radio receiver is suitable for such use, as is any analogous receiver such as a satellite receiver or an acoustic receiver. A circuitry diagram for a typical burn-wire release mechanism is depicted in FIG. 19. Burn-wires 20 and 36, depicted in FIGS. 7 and 6, respectively, are of the type suitable for use with the burn-wire release mechanism of the present invention. To effectuate release by way of the burn-wire system, an on-board microprocessor switches a logic circuit from low to high. After a brief delay imparted by a resistor-capacitor pair in a regulating circuit, the switching of the microprocessor applies the power of a standard battery stored inside housing 4 through a feed-through in housing 4 and across a partially un-insulated stainless steel wire, such as burn-wires 20 and 36, and an electrode (not shown), both of which are external to housing 4 and separated from one another by salt water. Upon the application of such current through a wire, such as wire 21, the un-insulated portion of the stainless steel wire corrodes, or dissolves, due to a galvanic reaction in about three to five minutes.

The burn-wire release system of the present invention is configured such that the positive (+) lead of the battery is electrically connected to a lead wire inside housing 4. The lead wire passes through a feed-through in housing 4 and is then electrically connected to a 100 to 300 lb. test stainless steel wire immersed in salt water outside housing 4. The stainless steel wire is installed in any convenient manner that secures housing 4 to the attachment means of choice, such as fin attachment means 39, a vacuum-assisted suction attachment means, a FLOY tag or an epoxy mount. The attachment means is then affixed to the host, It is essential to the proper reaction of the burn-wire release system that the entire length of stainless steel wire is insulated from the surrounding salt water with any suitable insulation, such as poly-vinyl-chloride sheathing, a flexane dip or silicone, except that a small, localized cut of approximately 1mm in length should be made in the insulation at the desired point of corrosion. The point of corrosion should be selected such that disintegration of the stainless steel wire at the point of corrosion will permit disengagement of housing 4 from the attachment means. The negative (−) lead of the battery is electrically connected to a common ground and then passed through housing 4 at a feed-through. The negative (−) lead of the 9-volt battery is then secured to the external surface of housing 4 with a stainless steel screw where it is exposed to the surrounding salt water. When the logic activates the circuit to connect the positive (+) lead of the 9-volt battery to the stainless steels wire, electrical current is sent from the positive (+) lead of the battery through the stainless steel wire to the external ground. The small incision in the insulation of the stainless steel wire enables the electrical current to flow through the stainless steel wire at its exposed portion, thereby permitting a localized galvanic reaction which results in the disintegration of the stainless steel wire at the incision. Placing the small incision such that disintegration of the stainless steel wire at the incision will release the system from its mount permits the system to be disengaged upon command.

RECORDING AND TRANSMISSION OF IMAGES AND DATA

The system of the present invention may be used to house any typical compact video camcorder or other image recovering device such as an optical disc or RAM storage device available for consumer use. Video images and audio signals may be recorded on videotape and camcorders operating in standard recording formats such as Hi-8 and Digital Video have been employed in the system with success. While secured to its host, the system records images from the host's "point-of-space," a spatial position that is somewhat analogous to the host's "point-of-view," except that the orientation may not necessarily be aligned with the host's visual field. In addition, the system records environmental data such as temperature, pressure, velocity, acceleration, compass orientation, light level and other environmental conditions, as well as physiological parameters such as heart rate, blubber temperature, stomach temperature or any other desired measurement. Systems have been successfully used to acquire data on various matters, including use of habitat, both vertical and horizontal; foraging activities such as terrain encountered, strategies, selected target prey species and methods of consumption; sociality across and within species; territorial and reproductive displays; vocalization; locomotion; and diving behavior such as dive profiles and activity, surface intervals and behavior and respiration. When combined with environmental data, this physiological data can produce a coherent record of behavior and ecology. Data may be stored in on-board memory modules, such as chips comprised of random access flash or other forms of memory. It is anticipated that as off-the-shelf video and data storage capabilities improve, the system will be capable of utilizing such new technologies, thereby enabling the study of more species, the collection of more data and improved targeting of answers to questions of scientific and documentary interest.

Figure 12A:
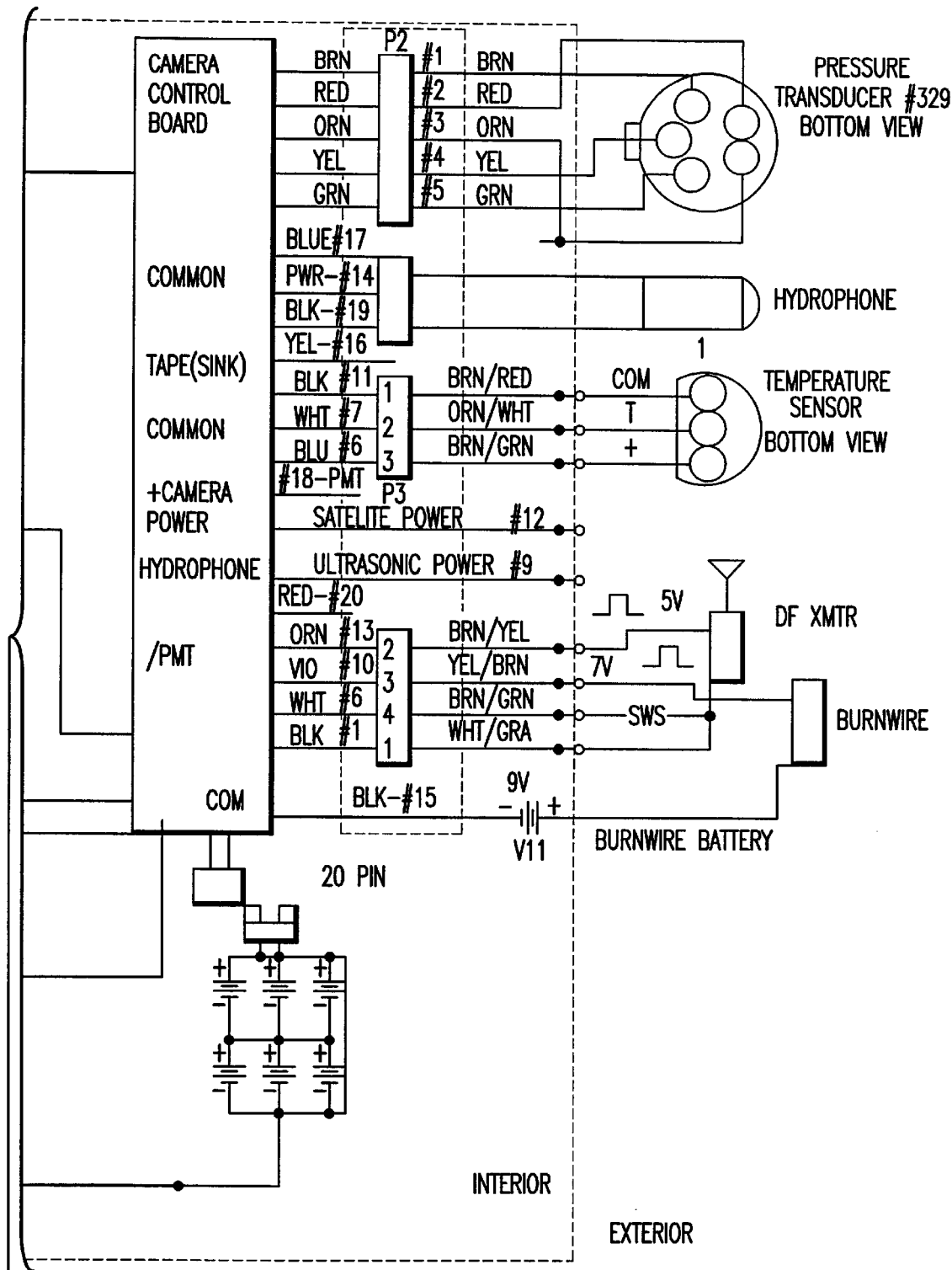
FIG. 12 is a circuitry diagram for video-image capturing instrumentation.
Figure 16:
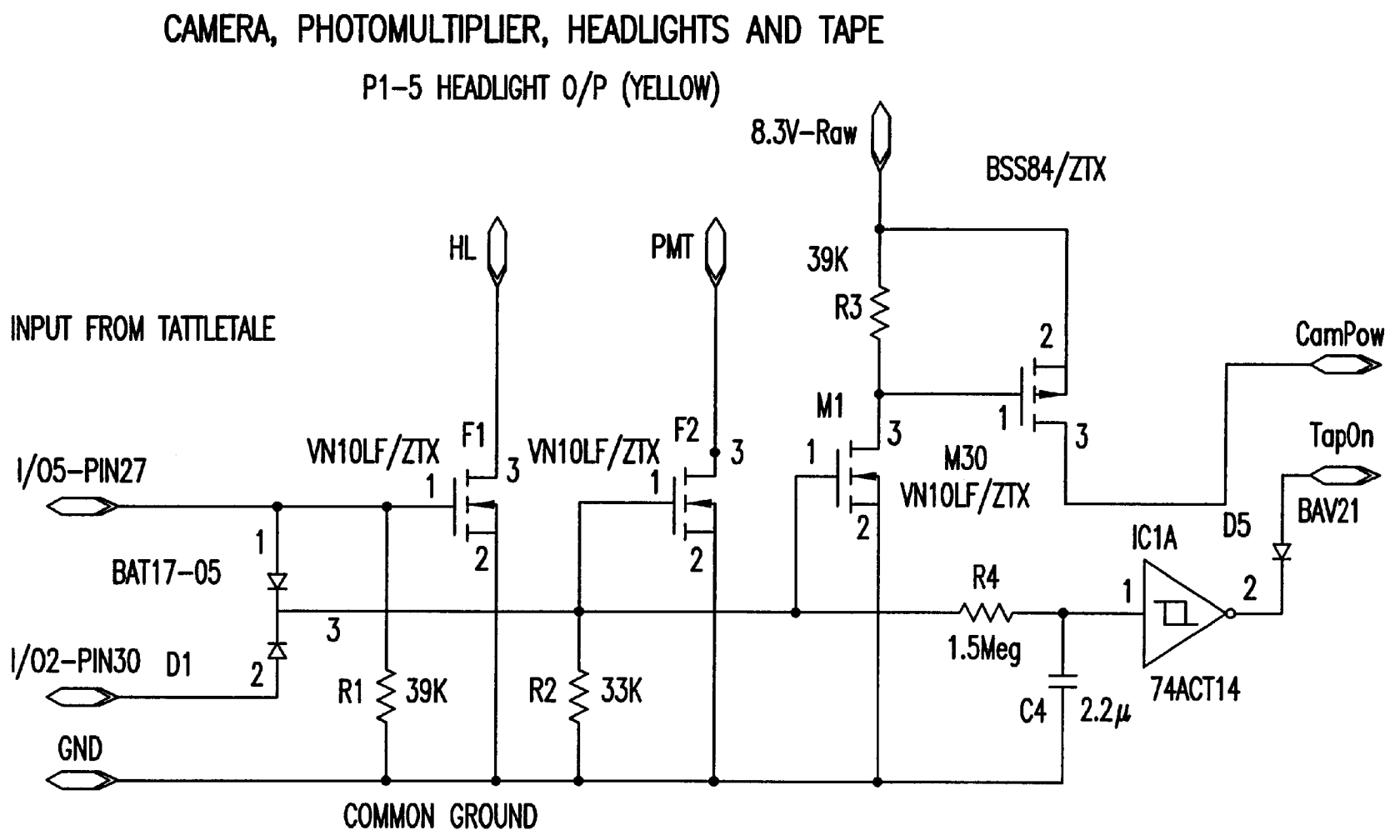

To convert a typical camcorder for use in the present system, the consumer camcorder is disassembled to its constituent components. Generally, consumer camcorders include a charged couple device (CCD), a recording deck, a control board and an audio board. These components are reconfigured and attached to a manufactured base-plate which fits within housing 4. The anterior portion of the base-plate normally carries the optical assembly comprised of the CCD outfitted with a wide angle, auto-iris lens suitable for use with the CCD. The posterior portion of the base-plate normally carries a data logger, memory modules and a microcomputer control module. Remaining components are secured within housing 4 wherever space permits. A circuitry diagram for a typical digital video system is depicted in FIG. 12. A typical power supply circuit used for powering a camera and related components is depicted in FIG. 16.

When the system is used to record images or data, recovery of the system is desired. However, according to an alternative embodiment of the present invention, an RF transmitter may be employed within the system to telemeter images and data to a remote location for analysis and/or storage, thereby rendering recovery of the system optional. Preferably, any RF electronic components should be housed within a metalized casing as is practicable in order to shield such components from external interference.

POWER SUPPLY

Figure 13:
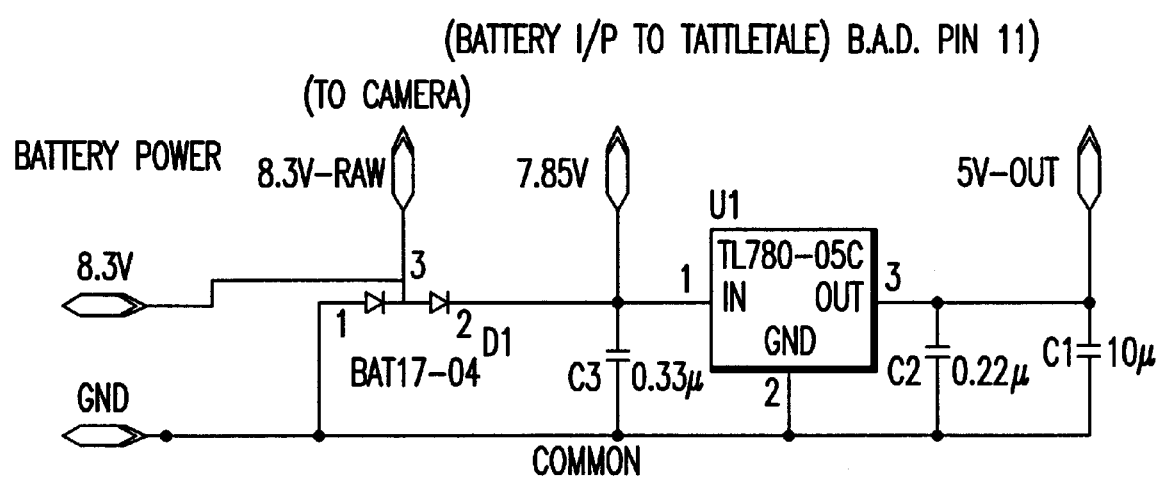
FIG. 13 is a circuitry diagram for power supply instrumentation.

The system can be powered by any high output battery source, such as lithium-ion battery packs, which combine adequate power output with acceptable consumption of volume. As battery technology improves, new power supplies can be incorporated into the system as appropriate. With any power supply, the objective is to balance the duration of deployment with the weight and volume of the system in order to maximize image and data logging. A circuitry diagram for a typical power supply is depicted in FIG. 13.

MICROCOMPUTER CONTROL

Imaging and data logging capabilities of the system may be controlled by a control unit such as a microcomputer or a microcontroller. The selected control unit should preferably be small in size and have low power drain. The control unit logs data from environmental sensors in memory modules when such data is not recorded with the video signal, and controls all other functions of the various subsystems incorporated into the system. According to one embodiment of the present invention intended for use in salt water, the on-board control unit may optionally be initialized and activated by a salt water switch. Using an appropriately-programmed control unit, data acquisition can be controlled by optionally selecting various triggering events, such as specified time sampling intervals and durations; salt water immersion; depth; temperature; activity level or any other measured parameter. Thus, the control unit allows considerable latitude in system control and data-logging capabilities for targeted sampling, as well as in-field response to changing logistical, environmental and biological conditions. A graphical user interface may optionally be employed to enable relatively untrained collaborators to easily reprogram systems in the field as conditions or priorities change.

Depending on the research objective, the system of the present invention can record or transmit behavioral events over a span of days or weeks using discrete sampling. If desired, the system can remain in standby mode with only its most essential subsystems operating until a specific time when recording sessions are initiated on a preprogrammed schedule or upon the receipt of an appropriate command sent by a remote operator. A typical recording session might include commands to standby 30 minutes, record 1 minute and then repeat until disengagement of the system. Further targeting of particular behavior is possible using measured parameters, such as depth or temperature, to control recording or transmission sessions. For example, if behavior of interest in an aquatic species is believed to occur at a given depth or range of depths, the control unit can be programmed to record data only in that desired interval. The control unit can also be programmed to control VHF, ultrasonic and satellite transmitters.

IMAGE ENHANCEMENT

In order to document behavior in virtual darkness, an optional image-intensification system may be incorporated into an embodiment of the present invention. According to this embodiment, an electronic image intensifier is inserted behind and in line with the objective lens, thereby amplifying any incidental light. Use of the image intensifier requires an array of lenses behind the intensifier which focuses the amplified image on the CCD. Embodiments of the present invention have been successfully deployed using a commercially available "Gen3(+)" gallium-arsenic-phosphide photo-multiplier tube, which combines considerable light sensitivity of 800 $\mu$A/lm and 50,000× light amplification over a broad spectrum of light ranging from 450 to 950 nm with a relatively long tube life. Thus, the system of the present invention enables the resolution of images under very low light conditions. It is anticipated that as photo-multiplier technology advances, the new technologies will be incorporated into the system of the present invention.

Figure 8:
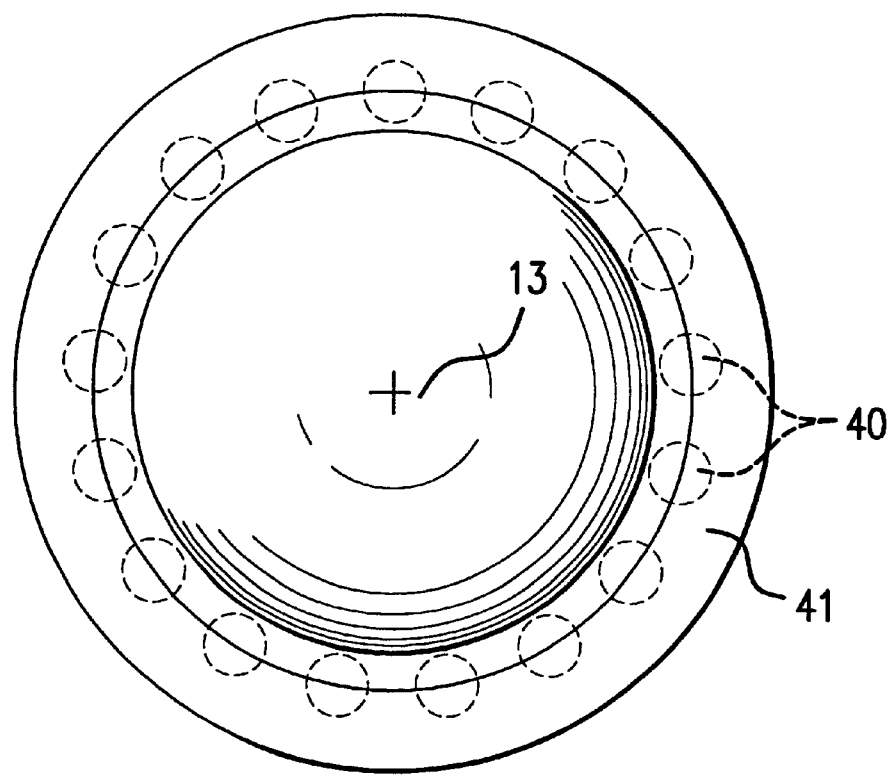
FIG. 8 is a front view of a near infrared dome assembly showing a ring of multiple infrared light-emitting diodes encircling a translucent viewport for providing illumination.
Figure 9:
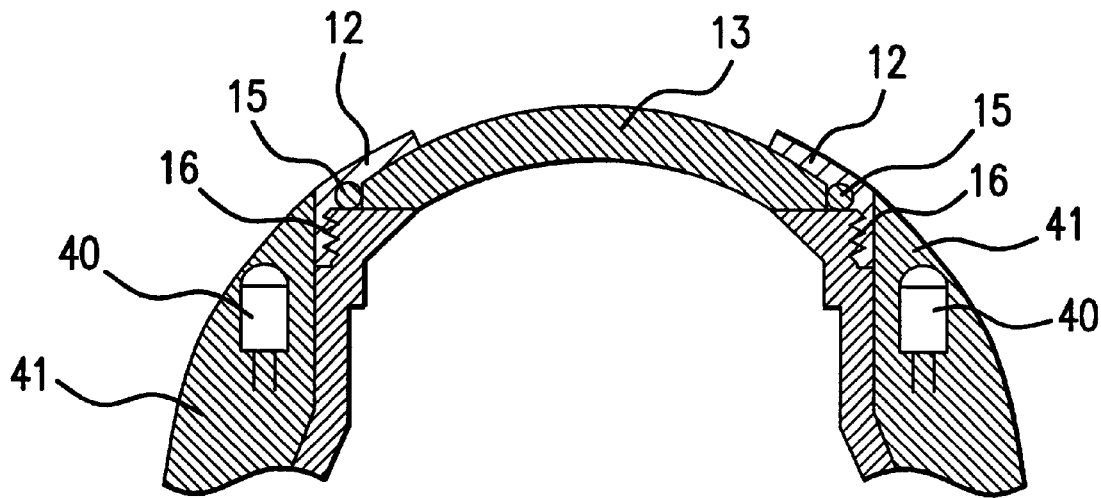
FIG. 9 is cross-sectional side view of a near infrared dome assembly showing only one of a multitude of infrared light-emitting diodes for providing illumination adjacent to a translucent viewport.

For applications where ambient light is insufficient to activate an image intensifier, a low power light source may be added to the system near viewport 13. A ring comprising a plurality of high output light emitting diodes (LEDs) 40 or other suitable illuminators encircling viewport 13 may be used to provide illumination adequate for recording images as depicted in FIGS. 8 and 9. LEDs 40 are disposed within translucent ring 41. LEDs which provide near infrared illumination are preferred for their relatively low biological impact and their correspondence with the maximum absorption wavelength of the image intensifier. It is anticipated that as LED or other illumination technology advances, the new technologies will be incorporated into the system of the present invention.

SYSTEM TRACKING AND RECOVERY

Figure 17:
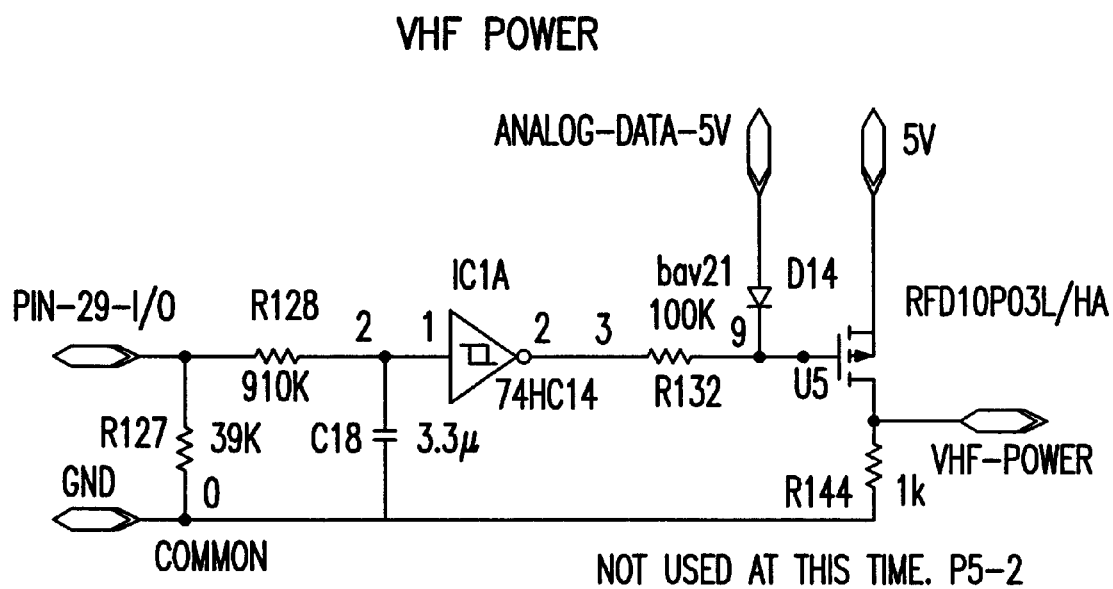
FIG. 17 is a circuitry diagram showing instrumentation for providing VHF power.

An embodiment of the present invention which is recording (as opposed to transmitting, as in other embodiments) images or other data must be recovered in order to retrieve data. To facilitate recovery, tracking should ordinarily commence immediately upon disengagement of the system from its host. However, an ultrasonic transducer emitting an ultrasonic signal at a frequency of about 75 kHz is preferred for use with sharks, sea turtles and whales, such that tracking can commence immediately upon deployment. In addition to, or in lieu of, an ultrasonic transmitter, a VHF transmitter emitting an RF signal at a frequency of about 150 MHz is preferred for use with surfacing animals. For tracking a species whose movement during deployment of the system may exceed the capabilities of VHF tracking, such as sperm whales, a satellite-receivable transmitter is preferred for use with the system. A circuitry diagram for a typical VHF power supply is depicted in FIG. 17.

Once disengaged from the host, both aquatic and terrestrial systems may be located and recovered by triangulating the tracking beacon emitted by the system. Systems deployed on pinnipeds may be manually removed while leaving the epoxy mount intact for subsequent use in the same season or removing it by carefully separating the mount from the pelage layer or simply allowing sufficient time for molting.

EMBODIMENTS FOR TERRESTRIAL DEPLOYMENT

An embodiment of the present invention intended for use in studying terrestrial species may optionally transmit images or data for analysis of recording at a remote location. When selecting a transmitter, it is preferable to employ a transmitter capable of broadcasting an RF signal over a range of frequencies within the broadcast VHF and UHF spectrums, thereby allowing flexibility in responding to the demands of individual circumstances in the field as well as any applicable local regulations or laws. A sensitive receiving apparatus comprised of multiple high-gain antennas and low noise preamplifiers is preferred for use with such a transmitter. Transmitter power is generally limited by the power supply as dictated by the size of the host, while a relatively large receiving antenna array must be used in order to optimize reception distance. The size and complexity of the receiving system is generally limited only by what a researcher is capable of transporting to the base station. Transmitter power and antenna size are inversely proportional to one another. It is desirably to reduce the power output of the transmitter as much as possible in order minimize its size and extend battery life.

REMOTE CONTROL CAPABILITIES

The addition of a control unit and a remote control makes a number of highly advanced features available to the system. Functions controlled wirelessly from the base station may include harness release, transmit power, audio level, channel select, carrier fine tune, camera activate, camera select, camera attitude, camera zoom, lens cleaner, harness release, audio level, location annunciator, visible locator lamp or photo strobe activation. Wireless feedback from the system to the base station could report on the status of the system as well as its subsystems by reporting information such as transmitter power, battery level, remote command receipt, remote command execution and locator beacon signal. The control unit may even be set for a number of automatic functions such as transmitter activation upon movement, daylight or pre-set intervals. Harness release and beacon activation could also be programmed to occur automatically upon the detection of low power levels.

What is claimed is:

1. A system for securing instrumentation to an animal, comprising:

a housing having a contiguous cavity disposed therein, said housing comprising:

a body having a forward end and a rearward end;

a nose assembly connected to said forward end of said body;

a tail assembly connected to said rearward end of said body; and means for securing said housing to said animal, wherein said means for securing said housing to said animal comprises a vacuum-assisted suction attachment means, and wherein said means for securing said housing to said animal further comprises a burn-wire system.

2. A system, as recited in claim 1, wherein said means for securing said housing to said animal further comprises a release pin.

3. A system, as recited in claim 2, wherein said release pin is magnesium.

4. A system, as recited in claim 3, wherein said means for securing said housing to said animal further comprises a tether.

5. A system for securing instrumentation to an animal, comprising:
   a housing having a contiguous cavity disposed therein, said housing comprising:
   a body having a forward end and a rearward end;
   a nose assembly connected to said forward end of said body;
   a tail assembly connected to said rearward end of said body; and
   means for securing said housing to said animal,
   wherein said means for securing said housing to said animal comprises a floy tag.

6. A system, as recited in claim 5, wherein said means for securing said housing to said animal further comprises a burn-wire system.

7. A system, as recited in claim 6, wherein said means for securing said housing to said animal further comprises a release pin.

8. A system, as recited in claim 7, wherein said release pin is magnesium.

9. A system, as recited in claim 8, wherein said means for securing said housing to said animal further comprises a tether.

10. A system for securing instrumentation to an animal, comprising:
    a housing having a contiguous cavity disposed therein, said housing comprising:
    a body having a forward end and a rearward end;
    a nose assembly connected to said forward end of said body;
    a tail assembly connected to said rearward end of said body; and
    means for securing said housing to said animal,
    wherein said means for securing said housing to said animal further comprises epoxy,
    wherein said means for securing said housing to said animal comprises a burn-wire system.

11. A system, as recited in claim 10, wherein said means for securing said housing to said animal further comprises a release pin.

12. A system, as recited in claim 11, wherein said release pin is magnesium.

13. A system, as recited in claim 12, wherein said means for securing said housing to said animal further comprises a tether.

14. A system for securing instrumentation to an animal, comprising:
    a housing having a contiguous cavity disposed therein, said housing comprising:
    a body having a forward end and a rearward end;
    a nose assembly connected to said forward end of said body;
    a tail assembly connected to said rearward end of said body; and
    means for securing said housing to said animal,
    wherein said means for securing said housing to said animal comprises a fin attachment means,
    wherein said means for securing said housing to said animal further comprises a burn-wire system.

15. A system, as recited in claim 14, wherein said means for securing said housing to said animal further comprises a release pin.

16. A system, as recited in claim 15, wherein said release pin is magnesium.

17. A system, as recited in claim 16, wherein said means for securing said housing to said animal further comprises a tether.

18. A system for securing instrumentation to an animal, comprising:
    a housing having a contiguous cavity disposed therein, said housing comprising:
    a body having a forward end and a rearward end;
    a nose assembly connected to said forward end of said body;
    a tail assembly connected to said rearward end of said body; and
    means for securing said housing to said animal,
    wherein said means for securing said housing to said animal comprises a mechanical squib release.

19. A system, as recited in claim 18, wherein said means for securing said housing to said animal further comprises a burn-wire system.

20. A system, as recited in claim 19, wherein said means for securing said housing to said animal further comprises a release pin.

21. A system, as recited in claim 20, wherein said release pin is magnesium.

22. A system, as recited in claim 21, wherein said means for securing said housing to said animal further comprises a tether.

23. A system for securing instrumentation to an animal, comprising:
    a housing having a contiguous cavity disposed therein, said housing comprising:
    a body having a forward end and a rearward end;
    a nose assembly connected to said forward end of said body;
    a tail assembly connected to said rearward end of said body; and
    means for securing said housing to said animal,
    wherein said means for securing said housing to said animal comprises a suction cup,
    wherein said means for securing said housing to said animal further comprises a burn-wire system.

24. A system, as recited in claim 23, wherein said means for securing said housing to said animal further comprises a release pin.

25. A system, as recited in claim 24, wherein said release pin is magnesium.

26. A system for securing instrumentation to an animal, comprising:
    a submersible housing having a cavity, said housing comprising a body having opposing first and second ends;
    a tail assembly connected to said first end of said body;
    a nose assembly connected to said second end of said body; and
    a vacuum-assisted suction attachment means moveably affixed to said housing,
    wherein said vacuum-assisted suction attachment means is affixed to said housing by a burn-wire system.

27. A system, as recited in claim 26, further comprising a release pin.

28. A system, as recited in claim 27, wherein said release pin is magnesium.

29. A system, as recited in claim 26, wherein said vacuum-assisted suction attachment means is moveably affixed to said housing by a tether.

30. A system for securing instrumentation to an animal, comprising:
- a submersible housing having a cavity, said housing comprising a body having opposing first and second ends;
- a tail assembly connected to said first end of said body;
- a nose assembly connected to said second end of said body; and
- a fin attachment means affixed to said housing,
- wherein said fin attachment means is affixed to said housing by a burn-wire system.

31. A system, as recited in claim 30, further comprising a release pin.

32. A system, as recited in claim 31, wherein said release pin is magnesium.

33. A system for securing instrumentation to an animal, comprising:
- a submersible housing having a cavity, said housing comprising a body having opposing first and second ends;
- a tail assembly connected to said first end of said body;
- a nose assembly connected to said second end of said body;
- a tether having opposing first and second ends, said first end of said tether being affixed to said housing; and
- fin attachment means affixed to said second end of said tether.

34. A system for securing instrumentation to an animal, comprising:
- a submersible housing having a cavity, said housing comprising a body having opposing first and second ends;
- a tail assembly connected to said first end of said body;
- a nose assembly connected to said second end of said body; and
- a floy tag affixed to said housing.

35. A system, as recited in claim 34, wherein said floy tag is affixed to said housing by a burn-wire system.

36. A system, as recited in claim 35, further comprising a release pin.

37. A system, as recited in claim 36, wherein said release pin is magnesium.

38. A system for securing instrumentation to an animal, comprising:
- a housing having a cavity, said housing comprising a body having opposing first and second ends;
- a tail assembly connected to said first end of said body;
- a nose assembly connected to said second end of said body; and
- a mechanical squib release affixed to said housing.

* * * * *